United States Patent
Nakamura et al.

(10) Patent No.: US 6,900,157 B2
(45) Date of Patent: May 31, 2005

(54) PROCESS FOR PRODUCTION OF PARTIALLY HYDROPHILIZED POROUS ADSORBENTS

(75) Inventors: Koji Nakamura, Shinnanyo (JP); Katsuo Komiya, Hikari (JP); Satoshi Fujii, Shinnanyo (JP)

(73) Assignee: Tosoh Corporation, Yamaguchi (JP)

( * ) Notice: Subject to any disclaimer, the term of this patent is extended or adjusted under 35 U.S.C. 154(b) by 235 days.

(21) Appl. No.: 10/236,920

(22) Filed: Sep. 9, 2002

(65) Prior Publication Data

US 2003/0050403 A1 Mar. 13, 2003

(30) Foreign Application Priority Data

Sep. 10, 2001 (JP) .................................. P.2001-272947
Sep. 10, 2001 (JP) .................................. P.2001-272948
Oct. 2, 2001 (JP) .................................. P.2001-306209

(51) Int. Cl.$^7$ .............................................. B01J 20/22
(52) U.S. Cl. ...................................... 502/401; 502/172
(58) Field of Search ................................. 502/401, 172

(56) References Cited

U.S. PATENT DOCUMENTS

| | | | | |
|---|---|---|---|---|
| 4,544,485 A | * | 10/1985 | Pinkerton et al. |
| 4,694,092 A | * | 9/1987 | Takahata et al. |
| 4,778,600 A | * | 10/1988 | Williams |
| 4,855,054 A | * | 8/1989 | Williams |
| 5,110,784 A | * | 5/1992 | Williams et al. |
| 6,074,555 A | * | 6/2000 | Boos et al. |

FOREIGN PATENT DOCUMENTS

| | | | |
|---|---|---|---|
| EP | 0 878 481 A1 | 11/1998 | |
| JP | 60-231740 A | * | 11/1985 |
| JP | 62-158112 A | * | 7/1987 |
| JP | 62-158113 A | * | 7/1987 |
| JP | 1-123145 A | * | 5/1989 |
| JP | 2-59415 A | * | 2/1990 |
| JP | 3-242306 A | * | 10/1991 |
| JP | 5-203636 A | * | 8/1993 |
| JP | 2001-518382 A | * | 10/2001 |
| WO | WO 89/07618 A1 | 8/1989 | |
| WO | 99/16545 A1 | * | 4/1999 |
| WO | 02/22253 A2 | * | 3/2002 |

OTHER PUBLICATIONS

Patent Abstracts of Japan (JP 02 036199 A) –1990.
Patent Abstracts of Japan (JP 06 296860 A) –1994.
European Search Report dated Apr. 6, 2004.

* cited by examiner

Primary Examiner—Stanley S. Silverman
Assistant Examiner—Edward M. Johnson
(74) Attorney, Agent, or Firm—Sughrue Mion, PLLC

(57) ABSTRACT

A process for production of a partially hydrophilized absorbent is described, which comprises using, as a starting material, porous particles made of an organic compound having properties such that they are shrunk in a solvent containing water as a major component and swollen in a solvent containing an organic solvent as a major component; newly introducing functional groups to react with any one compound selected from the group consisting of compounds containing hydroxyl, amino, carboxyl, halogen or epoxy group in a solvent containing an organic solvent as a major component; and then reacting with a compound containing alcoholic OH group in a solvent containing water as a major component to immobilize the compound containing alcoholic OH group on the outer surfaces of the particles.

9 Claims, No Drawings

PROCESS FOR PRODUCTION OF PARTIALLY HYDROPHILIZED POROUS ADSORBENTS

FIELD OF THE INVENTION

The present invention relates to a process for production of partially hydrophilized porous adsorbents (its outer surface is hydrophilic) and dual surface adsorbents having hydrophilic groups bound to the outer surface thereof and ligands bound to the inner surface (pore surface) thereof.

BACKGROUND OF THE INVENTION

Dual surface adsorbents whose outer surfaces are rendered hydrophilic and whose inner surfaces are modified by ligands have hitherto been used in the field of liquid chromatography and in the field of medical treatment. For example, when specified hydrophobic substances are removed from a sample liquid or blood, adsorbents whose outer surfaces are modified by hydrophilic ligands and whose inner surfaces are modified by ligands, are used in order to prevent a protein (for example, a blood coagulation factors) in the sample from adsorption on the outer surfaces of an adsorbents. Recently, applications of these dual surface adsorbents to removal of pathogenic blood constituents on bringing these adsorbents into contact with blood have been extensively investigated, where the resulting blood is then perfused into human body (a direct hemoperfusion method).

As the above-described adsorbents and production methods thereof, there have hitherto been known the method as described in JP-A-61-65159, the method as disclosed in JP-A-62-158113, and the method as disclosed in JP-A-3-218458.

The method as described in JP-A-61-65159 is a method in which porous silica particles having a glyceroylpropyl group introduced thereinto are used as a starting material, reacted with a carboxyl diimidazole compound, and subsequently bound to a hydrophobic oligopeptide (ligand), and the hydrophobic oligopeptide present on the outer surfaces of the silica particles is then decomposed by an enzyme. Accordingly, the thus produced particles exhibit hydrophilicity on the outer surfaces thereof, whereas they exhibit hydrophobicity in the inner portions thereof because the hydrophobic oligopeptide compound is held therein.

The method as disclosed in JP-A-62-158113 is a method in which silica particles having an octadecylsilyl group (hydrophobic group) introduced thereinto are used as a starting material and subjected to plasma processing, the hydrophobic group in an exposed area is eliminated, and the exposed area is converted to a silanol. When a hydrophilic organic group reactive with a silanol group is then introduced into the thus produced particles, the particles exhibit hydrophilicity on the surfaces thereof, whereas they exhibit hydrophobicity in the inner portions thereof.

The method as disclosed in JP-A-3-218458 is a method in which porous silica particles are brought into contact with a silicone polymer containing Si—H group, whereby the surfaces thereof are polymerized, and the resulting particles are reacted with a hydrocarbon compound containing vinyl group, or after converting the Si—H group into an Si—OH group, are reacted with an alkylsilane compound. The thus produced particles are then brought into contact with a Lewis acid under specific conditions to cleave the alkyl groups present on the outer surfaces thereof, and reacted with a hydrophilic silane compound. The resulting particles exhibit hydrophilicity on the surfaces thereof, whereas they exhibit hydrophobicity in the inner portions thereof.

As described above, the dual surface adsorbents are expected to have applications in various fields. But, according to the conventionally known methods, the production step is complicated and long. Further, in the case where, for example, an enzyme is used in the final surface processing, there is a problem that only those having a pore diameter such that the enzyme cannot enter the pores are produced.

In addition, in the case where the dual surface adsorbents are applied to the direct hemoperfusion method, a biocompatibility of the adsorbent to blood, i.e., a property that constitutional components of blood, such as platelets and proteins, are not adsorbed thereon, is important (see, for example, *KOBUNSHI RONBUNSHU* ("*Japanese Journal of Polymer Science and Technology*"), Vol. 39, No. 4, pp. 165–171 (1982); *J. Biomater. Sci. Polymer Edn*, Vol. 4, No. 4, pp. 381–400 (1993); and *Trans. Am. Soc. Artif. Intern. Organs.*, Vol. 35, pp. 333–335 (1989)).

SUMMARY OF THE INVENTION

A primary object of the invention is to provide a process for production of a partially hydrophilized porous adsorbent and a dual surface adsorbent from the former adsorbent, which can be realized through simple steps. A secondary object of the invention is to provide a process for production of a dual surface adsorbent having superior biocompatibility.

We, the present inventors made extensive and intensive investigations in order to achieve the above-described objects. As a result, we have reached the invention. Specifically, the invention is concerned with a process for production of partially hydrophilized porous adsorbents, which comprises using, as a starting material, porous particles comprising an organic compound having properties such that they are shrunk in a solvent comprising water as a major component and swollen in a solvent comprising an organic solvent as a major component; newly introducing functional groups to react with any one compound selected from the group consisting of compounds containing hydroxyl, amino, carboxyl, halogen or epoxy group in a solvent comprising an organic solvent as a major component; and then reacting this material with a compound containing alcoholic OH group in a solvent comprising water as a major component to immobilize the compound containing alcoholic OH group on the outer surfaces of the particles (hereinafter referred to as "first invention").

Also, the invention is concerned with a process for production of partially hydrophilized porous adsorbents, which comprises reacting porous particles impregnated in water-insoluble organic solvent with compounds containing alcoholic OH group in a solvent comprising water as a major component to immobilize the compound containing alcoholic OH group on the outer surface of the porous particles (hereinafter referred to as "second invention").

Moreover, the invention is concerned with a process for production of partially hydrophilized porous adsorbents, which comprises using, as a starting material, porous particles comprising an organic compound having functional groups to react with any one compound selected from the group consisting of compounds containing hydroxyl, amino, carboxyl, halogen or epoxy group and having properties such that they are shrunk in a solvent comprising water as a major component and swollen in a solvent comprising an organic solvent as a major component; and reacting with a compound containing alcoholic OH group in a solvent comprising water as a major component to immobilize the compound containing alcoholic OH group on the outer surfaces of the particles (hereinafter referred to as "third invention").

DETAILED DESCRIPTION OF THE INVENTION

First of all, the first invention will be described.

A compound containing alcoholic OH group which is widely used in the field of medical materials is a material exhibiting superior properties in biocompatibility. Thus, the present inventors have found that when the surfaces of the dual surface adsorbents are covered with the compound containing alcoholic OH group, the above-described secondary object of the invention can be achieved. Also, the present inventors have found that so far as any of particles comprising a sparingly water-soluble compound as a major component or particles comprising a water-soluble compound as a major component are porous particles having properties such that they are swollen in a solvent comprising an organic solvent as a major component and shrunk in a solvent comprising water as a major component, the dual surface adsorbent can be produced through simple steps by utilizing such properties.

In the above-described porous particles, the pore diameter is greatly reduced in the solvent comprising water as a major component, and the inner surfaces of the particles (pore surfaces) are hydrophobic, and hence, water hardly enters the particles. Accordingly, when the particles are reacted with a compound containing alcoholic OH group having superior biocompatibility in a solvent comprising water as a major component, the compound containing alcoholic OH group is immobilized only on the outer surfaces of the porous particles. Thus, during the production of the dual surface adsorbent, it is merely required to subsequently immobilize a ligand (such as hydrophobic substances) corresponding to a substance to be adsorbed and removed on the inner surfaces of the particles. As the ligand, in the case where, for example, endotoxin is to be adsorbed and removed, basic substances can be exemplified. The immobilization may be carried out in a customary manner.

The dual surface adsorbent is produced by immobilizing a ligand typified by a hydrophobic compound on the inner surface of the partially hydrophilized adsorbents as produced according to the invention. With respect to the porous particles to be used as a starting material for the production of the partially hydrophilized adsorbent, there are no specific restrictions so far as they have properties such that they are shrunk in a solvent comprising water as a major component and swollen in a solvent comprising an organic solvent as a major component and can introduce functional groups to react with any one compound selected from the group consisting of compounds containing hydroxyl, amino, carboxyl, halogen or epoxy group. More specifically, it is preferred to use porous particles having a degree of swelling such that, when a volume thereof in water is defined as 1, a volume thereof in a solvent comprising an organic solvent as a major component is 1.05 times or more, and preferably 1.1 times or more. However, since the swelling magnification varies depending on a degree of crosslinking of the porous particles, it is not meant that those falling outside the above-specified range cannot be used.

The porous particles capable of introducing functional groups to react with any one compound selected from the group consisting of compounds containing hydroxyl, amino, carboxyl, halogen or epoxy group may be produced by using a monofunctional monomer capable of introducing such functional groups.

As the monofunctional monomer, vinyl compounds such as N-vinyl alkylamides (wherein the alkyl group has from 1 to 20 carbon atoms, which may be linear or branched and may further contain an OH group, etc.); and aromatic compounds such as styrene, α-methylstyrene, alkylstyrenes, alkynostyrenes, vinylnaphthalene, alkylvinylnaphthalenes, alkynovinylnaphthalenes, vinylanthracene, alkylvinylanthracenes, alkynovinylanthracenes, vinylphenanthrene, alkylvinylphenanthrenes, and alkynovinylphenanthrenes (wherein the alkyl group has from 1 to 20 carbon atoms, which may be linear or branched, may contain an alicyclic group and/or an unsaturated double bond group, and may further contain an OH group) can be used.

These particles are crosslinked. As the crosslinking method, a method in which the crosslinking is carried out simultaneously with the polymerization by using a polyfunctional monomer together and a method in which the crosslinking is carried out after the polymerization can be used. However, from the standpoint of production of the particles at a low cost, the method in which the crosslinking is carried out simultaneously with the polymerization is preferred.

Examples of the polyfunctional monomer that is used for undergoing the crosslinking include compounds in which an OH group of a compound selected from polyethylene glycols represented by $HO(CH_2CH_2O)_nH$ (wherein the number of recurring units is in the relation with a hardness of the particles, and when it is too large, the particles become soft; and therefore, n is preferably in the range of from 1 to 30, more preferably in the range of from 1 to 20, and most preferably in the range of from 1 to 5) and compounds represented by $HO(CH_2CH(CH_3)O)_a$—$(CH_2CH_2O)_bH$ (wherein b is an integer of 1 or more, and a ratio of a to b is not particularly restricted and is independently preferably in the range of from 0 to 20, more preferably in the range of from 0 to 10, and most preferably in the range of from 0 to 5) is ester-bound to a (meth)acrylic compound.

Other examples of the polyfunctional monomer include bifunctional monomers such as compounds in which OH groups of a compound represented by $HO$—$C_nH_{2n}$—$OH$ (wherein n is in the range of from 3 to 10, and the alkylene group may be linear or branched) are ester-bound to a (meth)acrylic compound and compounds in which a compound represented by $HRN$—$C_nH_{2n}$—$NRH$ (wherein n is in the range of from 1 to 11, the alkylene group may be linear or branched, and R represents a hydrogen group and/or a linear or branched alkyl group having from 1 to 10 carbon atoms) is amide-bound to a (meth)acrylic compound. Still other examples of the polyfunctional monomer include compounds in which a polyhydric alcohol (such as glycerin, pentaerythritol, trimethylolethane, trimethylolpropane, and sorbitol) is ester-bound to a (meth)acrylic compound, triaryl isocyanurate compounds, divinylbenzene, dibinylnaphthalene, and divinylanthracene.

In the invention, the following monomers may be used in combination with the above-described monomer. Examples include (meth)acrylic compounds such as (meth)acrylic acid, glycidyl (meth)acrylate, alkyl (meth)acrylates (wherein the alkyl group has from 1 to 20 carbon atoms, which may be linear or branched and may contain an alicyclic compound, an aromatic compound, or an unsaturated double bond group, and the alkyl group may further contain an OH group), (meth)acrylamide, aminoethyl (meth)acrylamide, and N,N-dimethyl (meth)acrylamide; vinyl-based compounds such as vinyl chloride, vinyl acetate, and vinylene carbonate (wherein after polymerization, the vinyl group may be converted into an OH group through hydrolysis); aromatic compounds such as haloalkylstyrenes, haloalkyl vinylnaphthalenes, haloalkyl vinylanthracenes, haloalkyl vinylphenanthrenes, epoxyalkylstrenes, epoxyalkynostyrenes, stylyl glycidyl ether, and vinylbenzyl glycidyl ether; and aryl compounds such as aryl glycidyl ethers.

Here, the alkyl group has from 1 to 10 carbon atoms, which may be linear or branched and may contain an alicyclic group, an aromatic group, or an unsaturated double bond group, and the alkyl group may further contain an OH group or an amino group. Examples of the halogen group include Cl, Br, I, and F, and the halogen group may be bound to any primary, secondary or tertiary carbon.

As described above, the porous particles as the starting material can be obtained by using the monofunctional monomer capable of introducing functional groups to react and the other monofunctional monomer and crosslinking with the polyfunctional monomer. An adsorption ability of the dual surface adsorbent as produced according to the invention may be possibly lowered as the proportion of the other monofunctional monomer to be used increases. Accordingly, a proportion of the other monofunctional monomer to be used to the monofunctional monomer capable of introducing functional groups to react is preferably 70 mole % or less, more preferably 50 mole % or less, and most preferably 30 mole % or less. With respect to a proportion of the polyfunctional monomer to be used for the crosslinking, when it is too small, the dual surface adsorbent as produced according to the invention becomes soft. In such case, when, for example, the adsorbent is filled in a column, through which blood then passes, the adsorbent is deformed, possibly leading to a high backpressure. Accordingly, a proportion of the polyfunctional monomer to be used to the whole monomers is preferably 5% or more, and more preferably 10% or more and 70% or less.

With respect to the solvent that is used during the production of the porous particles as the starting material by use of the above-described monomers, there are not specific restrictions so far as it has an ability to dissolve the monomers to be used. It is preferred that the solvent is properly chosen corresponding to a substance to be adsorbed and removed depending on the dual surface adsorbent as produced according to the invention. When it is intended to adsorb and remove a large substance, a solvent having a relatively low affinity can be exemplified in order to increase the pore diameter. On the other hand, when it is intended to adsorb and remove only a small substance, a solvent having a high affinity can be exemplified in order to decrease the pore diameter. Incidentally, in the case where an adsorbent capable of adsorbing a larger amount of substances is produced, it is preferred to use porous particles having a larger surface area. But, the dimension of the surface area relies upon the pore diameter and the porosity (a proportion of spaces occupying in the particle volume). The pore diameter can be adjusted in the manners as described above, and the porosity can be adjusted by adjusting a ratio of the total sum of the monomers to the solvent. When it is intended to increase the porosity, it is required to increase the ratio of the solvent. When the porosity is too high, the adsorbent as produced according to the invention is liable to be broken. Accordingly, the porosity is adjusted to be preferably about 80% at maximum, and more preferably about 75% or less.

Next, a suspension method as a general production method of porous particles will be described. First of all, a predetermined amount of water is poured into a vessel equipped with an agitator. If desired, a surfactant and salts are added. This aqueous solution is elevated to a predetermined temperature, and thereafter, a monofunctional monomer, a polyfunctional monomer, a polymerization initiator, and a solvent are each precisely weighed in another vessel. This solution is poured into the former aqueous solution while agitating, and polymerization is subsequently carried out to produce porous particles. It is known that a revolution number of the agitator, a shape of agitating blades, a shape of the reactor, etc. influence the particle size of the produced particles. Accordingly, with respect to an apparatus actually used for the production, upon grasping the relation of the shape of agitating blades or the revolution number with the particle size of produced particles, the particle size of the particles to be produced is taken into consideration, and these are properly chosen or adjusted. Incidentally, in the case where the dual surface adsorbent as produced according to the invention is used for adsorption and removal of pathogenic substances contained in blood, when the particle size is too small, a backpressure generated during passing the blood is high so that the handling is difficult. On the other hand, when the particle size is too large, an efficiency of adsorption of the pathogenic substances is possibly lowered. In the case where the dual surface adsorbent to be used for the above-described application is produced, the particle size of the porous particles is preferably in the range of from 50 $\mu$m to 500 $\mu$m, and more preferably in the range of from 100 $\mu$m to 300 $\mu$m.

In the invention, the partially hydrophilized adsorbent is produced using the thus produced porous particles as the starting material. Its concrete method will be described below. First of all, a method for introducing functional groups to react will be described. During the production (polymerization) of the porous particles, in the case where a solvent that is not suited for the steps as described later is used, the particles are separated from the solvent. As the separation method, such as vacuum evaporation and washing the particles with readily water-soluble solvent followed by water and then drying can be used without any particular restrictions. Examples of the readily water-soluble solvent that can be used include acetone, methanol, ethanol, propanol, and dioxane.

Next, the produced porous particles are thoroughly immersed in a solvent comprising an organic solvent as a major component. Examples of the organic solvent that is used herein include ethylene dichloride, propylene dichloride, methylene chloride, carbon tetrachloride, trichloroethane, benzene, toluene, xylene, monochlorobenzene, and trichloroethylene. The solvent comprising an organic solvent as a major component is not limited to those as exemplified above so far as it has an ability to dissolve a reaction reagent (a reagent to be used for introducing functional groups to react, as described later) and can swell the porous particles.

Next, functional groups to react with, for example, a halomethyl group or a haoalkylcarbonyl group are introduced on the porous particles. In order to introduce the functional groups to react, for example, a halomethylation reaction or a Friedel-Crafts reaction may be carried out in the solvent. For example, in the case where the halomethylation reaction is carried out to introduce a halomethyl group, a halometylating agent is added to a solvent containing the swollen particles, a Friedel-Crafts catalyst (such as Lewis acid type catalysts selected from aluminum chloride, zinc chloride, titanium chloride, and tin chloride) is added dropwise thereto, and the mixture is allowed to react at room temperature or an elevated temperature, whereby the halomethyl group as the functional groups to react can be introduced on the aromatic ring. When a haloalkylcarbonyl halide is used in place of the halomethylating agent, and the same catalyst is added to undergo the Friedel-Crafts reaction, the haloalkylcarbonyl group as the functional groups to react can be introduced on the aromatic ring. As the halogen group used herein, any halogen groups of Cl, Br, I, and F can be used. The alkyl group has from 1 to 20 carbon atoms, which may be linear or branched, may contain an alicyclic compound, an aromatic compound, or an unsaturated double bond group, may contain an OH group, and may further contain a halogen group such as Cl, Br, I, and F.

Subsequently, a compound containing alcoholic OH group having superior biocompatibility is immobilized on the outer surfaces of the particles into which functional groups to react have been introduced. First of all, when the solvent of the particles is a sparingly water-insoluble solvent, the solvent is evaporated, or after washing the particles with a readily water-soluble solvent, the solvent within the particles is washed with water, thereby shrinking the particles. Thereafter, the thus shrunk particles are added to a solution comprising water as a major component and having the compound containing alcoholic OH group to be immobilized, dissolved therein, and if desired, an immobilizing catalyst is further added, followed by elevating the temperature to undergo an immobilization reaction. The type and the amount of the catalyst to be optionally added vary depending on the type of the compound to be immobilized and the immobilization condition and hence, cannot be unequivocally defined. However, examples of the generally used immobilizing catalyst include alkaline compounds such as LiOH, NaOH, KOH, and quaternary ammonium compounds.

Examples of the compound containing alcoholic OH group that is used in the invention include ethylene glycols. Specific examples of the ethylene glycols include ethylene glycol, diethylene glycol, polyethylene glycols represented by $HO(CH_2CH_2O)_nH$ (wherein when the number of recurring units is too large, hydrophobic substances such as pathogenic substances hardly enter pore portions within the particles; and therefore, n is preferably in the range of from 3 to 500, more preferably in the range of from 3 to 200, and most preferably in the range of from 3 to 100), and compounds represented by $HO(CH_2CH(CH_3)O)_a—(CH_2CH_2O)_b H$ (wherein a ratio of a to b is not particularly restricted so far as the compound is water-soluble and is independently preferably in the range of from 0 to 500, more preferably in the range of from 0 to 200, and most preferably in the range of from 0 to 100 (provided that b is an integer of 1 or more)).

Other examples of the compound containing alcoholic OH group include dihydric alcohols such as compounds represented by $HO—C_nH_{2n}—OH$ (wherein n is in the range of from 3 to 6, the alkyl group may be linear or branched, and the OH group may be primary, secondary or tertiary); trihydric alcohols such as glycerin, trimethylolethane, and trimethylolpropane; tetrahydric alcohols such as pentaerythritol, ditrimethylolethane, ditrimethylolpropane, erythritol, and threitol; pentahydric alcohols such as ribitol, arabinitol, and xylitol; and hexahydric alcohols such as allitol, dulcitol, glucitol, sorbitol, mannitol, altritol, and iditol. In addition, monosaccharides, disaccharides, and disaccharide-containing alcohols such as martitol and lactitol can also be used.

The partially hydrophilized adsorbent having an alcoholic OH group immobilized on the outer surface thereof can be produced through the above-described steps. Further, when a ligand having properties to adsorb hydrophobic substances such as pathogenic substances is immobilized on the inner surface of the adsorbent by applying known means, the dual surface adsorbent can be produced. One example thereof will be described below.

The ligand to be immobilized on the inner surface of the partially hydrophilized adsorbent is properly chosen depending on the type of the substance to be adsorbed and removed. In the case of endotoxin as a hydrophobic substance, examples of the useful ligand include polymyxin B and basic compounds containing a primary, secondary, tertiary or quaternary amine. In the case of heparin, examples of the useful ligand include basic compounds containing a primary, secondary, tertiary or quaternary amine. In the case of low density lipoprotein (LDL), examples of the useful ligand include anionic polymers such as poly(meth)acrylic acid, polystyrenesulfonic acid, heparin, and dextran sulfate. In the case of antibodies, examples of the useful ligand include hydrophobic amino acids such as phenylalanine and tryptophane, and protein A; and in the case of specific antibodies (such as antibodies against a specific cell receptor), examples of the useful ligand include polypeptides having an amino acid sequence of a target site (cell receptor) of the antibody. In the case of β2 microgloburin, examples of the useful ligand include hydrophobic alkyl groups such as a hexadecyl group.

Thus, the produced adsorbent and the ligand are added to a mixed solvent of an organic compound for swelling the adsorbent and water, and if desired, a catalyst is additionally added, followed by allowing the mixture to react at room temperature or an elevated temperature. Since the compound containing alcoholic OH group is already immobilized on the outer surface of the adsorbent, the hydrophobic ligand is not immobilized on the outer surface of the adsorbent but reacts only with the functional groups to react, which remains on the inner surface of the adsorbent, and is immobilized thereon. As a result, the dual surface adsorbent whose outer surface is immobilized with the compound containing alcoholic OH group having superior biocompatibility and whose inner surface is immobilized with the target ligand can be produced.

In the case where the dual surface adsorbent is produced by using, as a starting material, porous particles comprising an N-vinyl alkylamide as a major component, the following can be particularly exemplified. First of all, the particles are washed with a readily water-soluble solvent such as acetone and dioxane, and subsequently with water to thoroughly remove the readily water-soluble solvent, or the readily water-soluble solvent is removed by an evaporation method. Next, the washed particles are added to an alkaline aqueous solution, and the temperature is increased to cause hydrolysis only at the outer surfaces of the particles. Thereafter, the particles are separated and washed with water. Next, the washed particles and an alcoholic compound containing halogen group and optionally, an alkaline catalyst are added to a water solvent to produce particles having an alcohol immobilized on the outer surfaces thereof. Examples of the alcoholic compound containing halogen group include 2-haloethanols, 2-haloethoxy-2-ethanols, 3-halo-1-propanols, and 3-halo-1,2-propanediols, but the alcoholic compound containing halogen group is not limited thereto.

Next, the particles are washed with water and then added to an alkaline aqueous solution, followed by elevating the temperature to effect hydrolysis of an amide-bound portion present on the inner surfaces thereof. The thus produced particles are a partially hydrophilized adsorbent whose outer surface is immobilized with the compound containing alcoholic OH group and whose inner surface is immobilized with an amino group rich in reactivity. Accordingly, if desired, it is possible to subsequently immobilize a ligand on the inner surface of the adsorbent.

Next, the second invention will be described.

A compound containing alcoholic OH group is a material exhibiting superior properties in biocompatibility, which is widely used in the field of medical materials. Thus, the present inventors made extensive investigations on how to cover the outer surfaces of the porous particles with the compound containing alcoholic OH group. As a result, it has been found that when the porous particles are impregnated with a water-insoluble organic solvent and added, in a state that the inner portions of the particles are filled with the organic solvent, to a solvent comprising water as a major component together with the compound containing alcoholic OH group to be immobilized, and if desired, a catalyst is further added, to allow the mixture to react, the compound containing alcoholic OH group hardly enters the inner portions of the particles because it is water-soluble, whereby the compound containing alcoholic OH group can be immobilized only on the outer surfaces of the porous particles. Also, it has been found that when, after producing the porous adsorbent, a basic substance or the like is immobilized on the inner surface of the porous adsorbent in a customary manner, the dual surface adsorbent can be simply produced. In the thus produced dual surface adsorbent, since the outer surface thereof is covered by the compound containing alcoholic OH group having superior biocompatibility, the adsorbent does not adsorb platelets or the like. Also, the ligand having an ability to adsorb pathogenic substances contained in blood is immobilized on the inner surface of the adsorbent. Accordingly, the produced dual surface adsorbent is highly adaptive to, for example, a direct hemoperfusion method.

With respect to the porous particles that are used as a starting material for production of the porous adsorbent according to the invention, there are no specific restrictions so far as they have properties such that the water-insoluble organic solvent can be impregnated therein. In the case where the dual surface adsorbent having a ligand or the like immobilized on the inner surface thereof is produced, are preferred those produced by polymerizing a monomer having functional groups to react with any one of compounds containing hydroxyl, amino, carboxyl, halogen or epoxy group, or those produced by polymerizing a monomer capable of introducing functional groups reactive with the foregoing compound. The term "impregnation" as referred to herein means that the porous particles get intimate with the water-insoluble organic solvent so that the pores thereof can be filled with the organic solvent, and includes not only the case where when the porous particles are added to the water-insoluble organic solvent, the particles are swollen with the organic solvent, but also the case where the water-insoluble organic solvent merely enters the particle pores. In other words, the invention is characterized in that an aqueous solution having the compound containing alcoholic OH group dissolved therein does not enter the pores of the porous particles.

As the monomer that can be used for the production of the porous particles, having functional groups to react with the foregoing compound or capable of introducing functional groups to react, the following monofunctional monomers can be exemplified.

Examples include (meth)acrylic compounds such as glycidyl (meth)acrylate, aminoalkyl (meth)acrylates, and aminoalkyl (meth)acrylamides (wherein the alkyl chain, which may be linear or branched, has from 1 to 20 carbon atoms, and the alkyl group may contain a saturated cyclic compound, an unsaturated cyclic compound, a saturated heterocyclic compound, or an unsaturated heterocyclic compound); vinyl compounds such as vinyl acetate and N-vinyl alkylamides (wherein the alkyl chain, which may be linear or branched, has from 1 to 20 carbon atoms); and aromatic compounds such as styrene, α-methylstyrene, alkylstyrenes, haloalkylstyrenes, vinylnaphthalene, alkylvinylnaphthalenes, haloalkylvinylnaphthalenes, vinylanthracene, alkylvinylanthracenes, haloalkylvinylanthracenes, vinylphenanthrene, alkylvinylphenanthrenes, haloalkylvinylphenanthrenes, haloalkynostyrenes, haloalkynovinylnaphthalnes, haloalkynovinylanthracenes, and haloalkynovinylphenanthrenes (wherein the alkyl chain, which may be linear or branched, has from 1 to 20 carbon atoms).

Also, those in which the halogen group in the foregoing compound is substituted, such as epoxy group-substituted monomers (e.g., epoxy alkylstyrenes, epoxy alkynostyrenes), glycidyl ether group-substituted monomers (e.g., vinyl benzylglycidyl ether), and amino group-substituted monomers (e.g., aminoalkylstyrenes) can be used. The halogen group as used herein includes Cl, Br, F, and I; and the alkyl group has from 1 to 20 carbon atoms, and preferably from 1 to 10 carbon atoms, which may be linear or branched and may further contain a saturated or unsaturated cyclic compound. The halogen group and the amino group may be bound to any primary, secondary or tertiary carbon; and the amino group may be in any primary, secondary or tertiary state.

These particles to be used as the starting material are crosslinked. As the crosslinking method, a method in which the crosslinking is carried out simultaneously with the polymerization of the monofunctional monomer by using a polyfunctional monomer together and a method in which the crosslinking is carried out after the polymerization can be used. However, from the standpoint of production of the particles at a low cost, the method in which the crosslinking is carried out simultaneously with the polymerization is preferred.

As the polyfunctional monomer that is used for undergoing the crosslinking, the above-described polyfunctional monomers can be used.

In the invention, the following monomers can be used in combination with the above-described monomer. Examples include (meth)acrylic compounds such as (meth)acrylic acid, alkyl (meth)acrylates, and (meth)acrylamides; and vinyl compounds such as vinyl chloride. Here, the alkyl group has from 1 to 20 carbon atoms, which may be linear or branched and may further contain a saturated or unsaturated cyclic compound.

As described above, the porous particles as the starting material can be obtained by using the monofunctional monomer capable of introducing functional groups to react and the other monofunctional monomer and crosslinking with the polyfunctional monomer. An adsorption ability of the dual surface adsorbent as produced according to the invention may be possibly lowered as the proportion of the other monofunctional monomer to be used increases. Accordingly, a proportion of the other monofunctional monomer to be used to the whole monofunctional monomers is preferably 70 mole % or less, more preferably 50 mole % or less, and most preferably 30 mole % or less. With respect to a proportion of the polyfunctional monomer to be used for the crosslinking, when it is too small, the dual surface adsorbent as produced according to the invention becomes soft. In such case, when, for example, the adsorbent is filled in a column, through which blood then passes, the adsorbent is deformed, possibly leading to a high backpressure. Accordingly, a proportion of the polyfunctional monomer to be used to the whole monomers is preferably 5% or more, and more preferably 10% or more and 70% or less.

The function of the solvent to be used during the production of the porous particles as the starting material using the monomers, the suspension polymerization method, and the particle size to be produced are described above.

In the invention, the partially hydrophilized adsorbent is produced using the thus produced porous particles as the starting material. Its concrete method will be described below. First of all, in the case where the porous particles as the starting material are produced using the monofunctional monomer capable of introducing functional groups to react, a method for introducing functional groups to react will be described. During the production (polymerization) of the porous particles, in the case where a solvent that is not suited for carrying out the steps as described later is used, the particles are separated from the solvent. As the separation method, such as a vacuum evaporation and washing the particles with a readily water-soluble solvent followed by water and then drying can be used without any particular restrictions. Examples of the readily water-soluble solvent that can be used include acetone, methanol, ethanol, propanol, and dioxane.

Next, the produced porous particles are thoroughly immersed in a solvent comprising an organic solvent as a major component. Examples of the organic solvent that is used herein include ethylene dichloride, propylene dichloride, methylene chloride, carbon tetrachloride, trichloroethane, benzene, toluene, xylene, monochlorobenzene, and trichloroethylene. The solvent comprising an organic solvent as a major component is not limited to those as exemplified above so far as it has an ability to dissolve a reaction reagent (a reagent to be used for introducing functional groups to react, as described later) and can swell the porous particles.

Next, functional groups to react, for example, a halomethyl group or a haoalkylcarbonyl group are introduced on the porous particles. In order to introduce the functional groups, for example, a halomethylation reaction or a Friedel-Crafts reaction may be carried out in the solvent. For example, in the case where the halomethylation reaction is carried out to introduce a halomethyl group, a halometylating agent is added to a solvent containing the swollen particles, a Friedel-Crafts catalyst (such as Lewis acid type catalysts selected from aluminum chloride, zinc chloride, titanium-chloride, and tin chloride) is added dropwise thereto, and the mixture is allowed to react at room temperature or an elevated temperature, whereby the halomethyl group as the functional groups to react can be introduced on the aromatic ring. When a haloalkylcarbonyl halide is used in place of the halomethylating agent, and the same catalyst is added to perform the Friedel-Crafts reaction, the haloalkylcarbonyl group as the functional groups to react can be introduced on the aromatic ring. As the halogen group that is used herein are employable any halogen groups of Cl, Br, I, and F. The alkyl group has from 1 to 20 carbon atoms, which may be linear or branched, may contain an alicyclic compound, an aromatic compound, or an unsaturated double bond group, and may further contain an OH group.

The invention is applied to the porous particles into which functional groups to react have been newly introduced as described above, or the porous particles having originally functional groups to react, thereby immobilizing the compound containing alcoholic OH group having superior biocompatibility on the outer surfaces of the particles. In the case where the solvent dissolving the compound containing alcoholic OH group remains in the inner portions of the porous particles as the starting material, or the solvent remaining in the inner portions of the porous particles is a solvent soluble in water or reactive with the compound containing alcoholic OH group, the solvent is replaced by an organic solvent which neither dissolves nor reacts with the compound containing alcoholic OH group. Further, in the case where a catalyst is optionally used during the immobilization, the solvent is displaced by an organic solvent not modified by the catalyst. As the displacement method, a method in which the solvent is removed in vacuo and a method in which washing is carried out using an organic solvent which neither dissolves nor reacts with the compound containing alcoholic OH group and that is inert to the catalyst can be used.

For example, in the case where the solvent is removed in vacuo, the water-insoluble organic solvent is impregnated in the porous particles. The "water-insoluble organic solvent" as referred to herein means an organic solvent that is insoluble in water, does not react with the compound containing alcoholic OH group, and is inert to the catalyst to be optionally used. The impregnation is carried out with thorough agitation such that the water-insoluble organic solvent enters the particle pores and penetrates into the inner surfaces thereof. During this time, it is preferred to elevate the temperature so as to promote the penetration. In the case where the porous particles are relatively high in hydrophilicity, and the water-insoluble organic solvent hardly penetrates into the inner surfaces of the particles, a water-soluble organic solvent that can be mixed with the water-insoluble organic solvent may be previously immersed in the porous particles and then replaced by the water-insoluble organic solvent.

After rendering the porous particles in the state having the water-insoluble organic solvent impregnated therewith, the porous particles are added to a solution comprising water as a major component, in which is dissolved the compound containing alcoholic OH group to be immobilized, and if desired, an immobilizing catalyst is further added, to proceed with an immobilization reaction. During the immobilization reaction, it is preferred to elevate the temperature. The type and the amount of the catalyst to be used vary depending on the immobilization method. One example will be given. Examples of the catalyst that can be used include alkaline compounds such as LiOH, NaOH, KOH, and quaternary ammonium compounds; and acidic compounds such as sulfuric acid, hydrochloric acid, phosphoric acid, and Lewis acids. In the case where the porous particles contain a halogen group, it is desired to use the alkaline compound as the catalyst.

As the compound containing alcoholic OH group that is used in the invention, those compounds as exemplified above can be used.

The partially hydrophilized porous adsorbent having an alcoholic OH group immobilized on the outer surface thereof can be produced through the above-described steps. Further, when a ligand having properties to adsorb hydrophobic substances such as pathogenic substances is immobilized on the inner surface of the adsorbent by applying known means, the dual surface adsorbent can be produced. One example thereof will be described below.

As the ligand to adsorb pathogenic substances or the like, which is immobilized on the inner surface of the partially hydrophilized porous adsorbent, those compounds as exemplified above can be used.

During the immobilization of the compound containing OH group on the surface, in the case where the organic solvent impregnated in the particles can dissolve the ligand to be immobilized, the particles and the ligand are added to the solvent, and if desired, the catalyst is further added, to proceed with the immobilization reaction. In the case where the organic solvent impregnated in the particles does not dissolve the ligand to be immobilized, after displacement of the organic solvent with a solvent that can dissolve the ligand in the above-described manner, the particles and the ligand are added to the solvent, and if desired, the catalyst is further added, to proceed with the immobilization reaction. While the immobilization reaction may proceed at an ordinary temperature, it is desired to elevate the temperature to promote the reaction. Since the compound containing alcoholic OH group is already immobilized on the outer surface of the partially hydrophilized porous adsorbent, even when the ligand is added, the immobilization reaction does not proceed on the outer surface, but only the reaction between the functional groups to react, which remains on the inner surfaces of the particles and the ligand, proceeds. As a result, the dual surface adsorbent whose outer surface is immobilized with the compound containing alcoholic OH group having superior biocompatibility and whose inner surface is immobilized with the target ligand can be produced.

Next, the third invention will be described.

A compound containing alcoholic OH group is a material exhibiting superior properties in biocompatibility, which is widely used in the field of medical materials. Thus, the present inventors have found that when the surface of the dual surface adsorbent is covered with the compound containing alcoholic OH group, the above-described objects of the invention can be achieved. Also, the present inventors have found that so far as the porous particles have properties such that they are swollen in a solvent comprising an organic solvent as a major component and shrunk in a solvent comprising water as a major component, the dual surface adsorbent can be produced through simple steps by utilizing such properties.

In the above-described porous particles, the pore diameter is greatly reduced in the solvent comprising water as a major component, and the inner surfaces of the particles (pore surfaces) are hydrophobic, and hence, water hardly enters the particles. Accordingly, when the particles are reacted with a compound containing alcoholic OH group having superior biocompatibility in a solvent comprising water as a major component, the compound containing alcoholic OH group is immobilized only on the outer surfaces of the porous particles. Thus, during the production of the dual surface adsorbent, it is merely required to subsequently immobilize a ligand (such as hydrophobic substances) corresponding to a substance to be adsorbed and removed on the inner surfaces of the particles. As the ligand, in the case where, for example, endotoxin is to be adsorbed and removed, basic substances or the like can be exemplified. The immobilization may be carried out in a customary manner.

The dual surface adsorbent is produced by immobilizing a ligand typified by a hydrophobic compound on the inner surface of the partially hydrophilized adsorbent as produced according to the invention. With respect to the porous particles to be used as a starting material for the production of the partially hydrophilized adsorbent, there are no specific restrictions so far as they have functional groups to react with any one compound selected from the group consisting of compounds containing hydroxyl, amino, carboxyl, halogen or epoxy group and have properties such that they are shrunk in a solvent comprising water as a major component and swollen in a solvent comprising an organic solvent as a major component. The swelling of the porous particles may be referred to as above.

The porous particles having functional groups to react with any one compound selected from the group consisting of compounds containing hydroxyl, amino, carboxyl, halogen or epoxy group may be produced by using an organic compound (a monofunctional monomer) having such functional groups.

As the monofunctional monomer, (meth)acrylic compounds such as glycidyl (meth)acrylate, aminoalkyl (meth)acrylates, and aminoalkyl (meth)acrylamides; aromatic compounds such as haloalkylstyrenes, haloalkyl vinylnaphthalenes, haloalkyl vinylanthracenes, haloalkyl vinylphenanthrenes, haloalkynostyrenes, haloalkynovinylnaphthalens, haloalkynovinylanthraquiones, haloalkynovinylphenathrenes, epoxyalkylstrenes, epoxyalkynostyrenes, stylyl glycidyl ether, and vinylbenzyl glycidyl ether; and aryl compounds such as aryl glycidyl ethers can be used.

Here, the alkyl group has from 1 to 10 carbon atoms, which may be linear or branched and may contain an alicyclic compound, an aromatic compound, or an unsaturated double bond group, and the alkyl group may further contain an OH group. Examples of the halogen group include Cl, Br, I, and F, and the halogen group may be bound to any primary, secondary or tertiary carbon.

These porous particles to be used as the starting material are crosslinked. As the crosslinking method, a method in which the crosslinking is carried out simultaneously with the polymerization by using a polyfunctional monomer together and a method in which the crosslinking is carried out after the polymerization can be used. However, from the standpoint of production of the particles at a low cost, the method in which the crosslinking is carried out simultaneously with the polymerization is preferred.

As the polyfunctional monomer that is used for undergoing the crosslinking, the above-described polyfunctional monomers can be used.

In the invention, the following monomers can be used in combination with the above-described monofunctional monomer. Examples include (met)acrylic compounds such as (meth)acrylic acid, alkyl (meth)acrylates (wherein the alkyl group has from 1 to 20 carbon atoms, which may be linear or branched, may contain an alicyclic compound, an aromatic compound, or an unsaturated double bond group, and may further contain an OH group), (meth)acrylamide, and N,N-dimethyl (meth)acrylamide; vinyl compounds such as vinyl formamide, vinyl acetamide, vinyl chloride, vinyl acetate, and vinylene carbonate (with respect to the amide-based vinyl monomers, the vinyl group may be optionally converted into an amino group through hydrolysis after the polymerization; and in the case of vinyl acetate, the vinyl group may be converted into an OH group through hydrolysis after the polymerization); and aromatic monomers such as styrene, α-methylstyrene, alkylstyrenes, vinylnaphthalene, alkylvinylnaphthalenes, vinylanthracene, alkylvinylanthracenes, vinylphenanthrene, alkylvinylphenanthrenes, alkynostyrenes, alkynovinylnaphthalenes, alkynovinylanthracenes, and alkynovinylphenanthrenes.

Here, the alkyl group has from 1 to 20 carbon atoms, which may be linear or branched and may contain an alicyclic group and/or an unsaturated double bond group, and the alkyl group may further contain an OH group. The OH group may be bound to any primary, secondary or tertiary carbon.

As described above, the porous particles as the starting material can be obtained by using the monofunctional monomer having functional groups to react and the other monofunctional monomer and crosslinking with the polyfunctional monomer. An adsorption ability of the dual surface adsorbent as produced according to the invention may be possibly lowered as the proportion of the other monofunctional monomer to be used increases. Accordingly, a proportion of the other monofunctional monomer to be used to the monofunctional monomer having functional groups to react is preferably 70 mole % or less, more preferably 50 mole % or less, and most preferably 30 mole % or less. With respect to a proportion of the polyfunctional monomer to be used for the crosslinking, when it is too small, the dual surface adsorbent as produced according to the invention becomes soft. In such case, when, for example, the adsorbent is filled in a column, through which blood then passes, the adsorbent is deformed, possibly leading to a high backpressure. Accordingly, a proportion of the polyfunctional monomer to be used to the whole monomers is preferably 5% or more, and more preferably 10% or more and 70% or less.

The function of the solvent to be used during the production of the porous particles as the starting material using the monomers, the suspension polymerization method, and the particle size to be produced are described above.

In the invention, the partially hydrophilized adsorbent is produced using the thus produced porous particles as the starting material. Its concrete method will be described below. The porous particles immediately after the production contain the sparingly water-soluble solvent used for the pore adjustment. Accordingly, first of all, the solvent is removed by, for example, evaporation, or after washing with and displacing by a readily water-soluble solvent, the residue is washed with water. Examples of the readily water-soluble solvent that can be used include acetone, methanol, ethanol, propanol, and dioxane.

Subsequently, the compound containing alcoholic OH group having superior biocompatibility is immobilized on the outer surfaces of the particles. First of all, the shrunk particles are added to a solution comprising water as a major component, in which is dissolved the compound containing alcoholic OH group to be immobilized, and if desired, an immobilizing catalyst is further added, followed by elevating the temperature to proceed with an immobilization reaction. The type and the amount of the catalyst to be used vary depending on the type of the compound to be immobilized and the immobilization condition and hence, cannot be unequivocally defined. However, in the case where the particles contain an epoxy group, examples of the immobilizing catalyst that is generally used include alkaline compounds such as LiOH, NaOH, KOH, and quaternary ammonium compounds; and acidic compounds such as sulfuric acid, hydrochloric acid, phosphoric acid, and Lewis acids. In the case where the porous particles contain a halogen group, it is desired to use the foregoing alkaline compound as the catalyst.

As the compound containing alcoholic OH group that is used in the invention, those compounds as exemplified above can be used.

The partially hydrophilized porous adsorbent having an alcoholic OH group immobilized on the outer surface thereof can be produced through the above-described steps. Further, when a ligand having properties to adsorb hydrophobic substances such as pathogenic substances is immobilized on the inner surface of the adsorbent by applying known means, the dual surface adsorbent can be produced. One example thereof will be described below.

As the ligand to adsorb pathogenic substances or the like, which is immobilized on the inner surface of the partially hydrophilized porous adsorbent, those compounds as exemplified above can be used.

Thus, the produced adsorbent and the ligand are added to a mixed solvent of an organic compound for swelling the adsorbent and water, and if desired, a catalyst is additionally added, followed by allowing the mixture to react at room temperature or an elevated temperature. Since the compound containing alcoholic OH group is already immobilized on the outer surface of the adsorbent, the hydrophobic ligand is not immobilized on the outer surface of the adsorbent but reacts only with the functional groups to react, which remains on the inner surface of the adsorbent, and is immobilized thereon. As a result, the dual surface adsorbent whose outer surface is immobilized with the compound containing alcoholic OH group having superior biocompatibility and whose inner surface is immobilized with the target ligand can be produced.

The invention will be described in more detail with reference to the following Examples, but it should not be construed that the invention is limited thereto.

PRODUCTION EXAMPLE 1

(1) Preparation of O Phase:

Styrene (16.9 g), 5.1 g of high-purity divinylbenzene, and 1.05 g of benzoyl peroxide (BPO) as an initiator were added to a mixed solvent of 3.7 g of toluene and 26 g of isoamyl alcohol, and the mixture was agitated.

(2) Preparation of W Phase:

A solution of 4 g of polyvinyl alcohol having a degree of hydrolysis of 88% and a degree of polymerization of 20,000 and 2.4 g of $Na_2SO_4$ in 210 g of water was heated at 80° C.

(3) Suspension Polymerization:

The O phase was added within a short period of time while agitating the W phase, and the mixture was allowed to polymerize for about 10 hours while keeping the temperature at 80° C.

(4) Washing of Porous Particles:

The thus produced particles were transferred on a Nutsche funnel having a filter paper placed thereon, and the W phase was filtered out. Thereafter, the residue was washed with dioxane in a volume of 10 times the particle volume.

(5) Chloromethylation Reaction:

To 90 g of the porous particles as dried were added 350 g of dichloroethane and 240 g of chloromethyl methyl ether, to swell the particles. Subsequently, 133 g of anhydrous aluminium chloride was added dropwise over about 2 hours such that the temperature of the reaction mixture did not exceed 30° C. The reaction was carried out for one hour, and the temperature of the reaction mixture was increased from 37° C. to 40° C. to proceed with the reaction for an additional 7 hours.

(6) Washing of Porous Particles:

The chloromethylated particles were transferred on a Nutsche funnel having a filter paper placed thereon, and the solvent and the reaction reagent were filtered out. Thereafter, the residue was washed with dioxane in a volume of 10 times the particle volume. Classification was carried out to extract porous particles having a particle size in the range of from 100 μm to 300 μm. Then, the particles were washed with water to wash out the dioxane. There were thus formed porous particles as a starting material for production of a dual surface adsorbent.

(7) Degree of Chloromethylation:

The porous particles as dried were subjected to elemental analysis to measure the chlorine content. On the assumption that the chloromethylation reaction would have been wholly carried out on the aromatic ring on styrene, a degree of introduction was calculated. As a result, it was 83.7%.

PRODUCTION EXAMPLE 2

(1) Preparation of O Phase:

Styrene (15.1 g), 6.9 g of high-purity divinylbenzene, and 0.95 g of BPO as an initiator were added to a mixed solvent of 3.7 g of toluene and 26 g of isoamyl alcohol, and the mixture was agitated.

(2) Preparation of W Phase:

A solution of 4 g of polyvinyl alcohol having a degree of hydrolysis of 88% and a degree of polymerization of 20,000 and 2.4 g of $Na_2SO_4$ in 210 g of water was heated at 80° C.

(3) Suspension Polymerization:

The O phase was added within a short period of time while agitating the W phase, and the mixture was allowed to polymerize for about 10 hours while keeping the temperature at 80° C.

(4) Washing of Porous Particles:

The thus produced particles were transferred on a Nutsche funnel having a filter paper placed thereon, and the W phase was filtered out. Thereafter, the residue was washed with dioxane in a volume of 10 times the particle volume.

(5) Chloromethylation Reaction:

The chloromethylation reaction was carried out in the same manner as in Production Example 1, except for using 100 g of the porous particles as dried.

(6) Washing of Porous Particles:

The chloromethylated particles were transferred on a Nutsche funnel having a filter paper placed thereon, and the solvent and the reaction reagent were filtered out. Thereafter, the residue was washed with dioxane in a volume of 10 times the particle volume. Classification was carried out to extract porous particles having a particle size in the range of from 100 μm to 300 μm. Then, the particles were washed with water to wash out the dioxane. There were thus formed porous particles as a starting material for production of a dual surface adsorbent.

(7) Degree of Chloromethylation:

With respect to the porous particles as dried, the degree of introduction of a chloromethyl group was obtained in the same manner as in Production Example 1. As a result, it was 82.1%.

PRODUCTION EXAMPLE 3

(1) Preparation of O phase:

Vinylbenzyl glycidyl ether (14.9 g), 5.3 g of high-purity divinylbenzene, and 0.35 g of azobisisobutyronitrile (AIBN) as an initiator were added to a mixed solvent of 8 ml of octane and 22 ml of 4-methyl-2-pentanol, and the mixture was agitated.

(2) Preparation of W Phase:

A solution of 4 g of polyvinyl alcohol having a degree of hydrolysis of 88% and a degree of polymerization of 20,000 and 3 g of $Na_2SO_4$ in 200 g of water was heated at 70° C.

(3) Suspension Polymerization:

The O phase was added while agitating the W phase, and the mixture was allowed to polymerize for about 10 hours while keeping the temperature at 70° C.

(4) Washing of Porous Particles:

The thus produced particles were transferred on a Nutsche funnel having a filter paper placed thereon, and the W phase was filtered out. Thereafter, the residue was washed with dioxane in a volume of 10 times the particle volume. Subsequently, classification was carried out to obtain porous particles having a particle size in the range of from 100 μm to 300 μm. Then, the particles were washed with water to wash out the dioxane. There were thus obtained porous particles.

PRODUCTION EXAMPLE 4

(1) Preparation of O Phase:

Glycidyl methacrylate (64.2 g), 13.0 g of ethylene glycol dimethacrylate, and 1.35 g of AIBN as an initiator were added to a mixed solvent of 128 g of ethyl acetate and 43 g of n-butyl acetate, and the mixture was agitated.

(2) Preparation of W Phase:

A solution of 15.2 g of polyvinyl alcohol having a degree of hydrolysis of 88% and a degree of polymerization of 20,000 and 5.4 g of $Na_2SO_4$ in 300 g of water was heated at 60° C.

(3) Suspension Polymerization:

The O phase was added while agitating the W phase, and the mixture was allowed to polymerize for about 15 hours while keeping the temperature at 60° C.

(4) Washing of Porous Particles:

The thus produced particles were transferred on a Nutsche funnel having a filter paper placed thereon, and the W phase was filtered out. Thereafter, the residue was washed with dioxane in a volume of 10 times the particle volume. Subsequently, classification was carried out to obtain porous particles having a particle size in the range of from 100 μm to 300 μm.

(5) Measure of Solution Content and Moisture Content:

A solution content of dioxane in the produced particles was obtained from a loss of weight by a Kett moisture meter upon heating at 120° C. for 15 minutes. As a result, the solution content was 70.2%. Thereafter, the particles were thoroughly washed with water to wash out the dioxane. There were thus obtained porous particles containing water. A moisture content of the particles was obtained from a loss of weight by a Kett moisture meter upon heating at 120° C. for 15 minutes. As a result, the moisture content was 60.9%.

PRODUCTION EXAMPLE 5

(1) Preparation of O Phase:

Vinylbenzyl glycidyl ether (17.0 g), 3.9 g of high-purity divinylbenzene, and 0.8 g of BPO as an initiator were added to a mixed solvent of 8.0 ml of octane and 22 ml of 4-methyl-2-pentanol, and the mixture was agitated.

(2) Preparation of W Phase:

A solution of 4 g of polyvinyl alcohol having a degree of hydrolysis of 88% and a degree of polymerization of 20,000 and 3 g of $Na_2SO_4$ in 200 g of water was heated at 80° C.

(3) Suspension Polymerization:

The O phase was added within a short period of time while agitating the W phase, and the mixture was allowed to polymerize for about 10 hours while keeping the temperature at 80° C.

(4) Washing of Porous Particles:

The thus produced particles were transferred on a Nutsche funnel having a filter paper placed thereon, and the W phase was filtered out. Thereafter, the residue was washed with dioxane in a volume of 10 times the particle volume. Subsequently, classification was carried out to obtain porous particles having a particle size in the range of from 100 μm to 300 μm. Then, the particles were washed with water to wash out the dioxane. There were thus obtained porous particles as a starting material for production of a dual surface adsorbent.

EXAMPLE 1

(1) Measurement of Exclusion Limit:

A gel slurry tetrahydrofuran (THF) solution of the porous particles as produced in Production Example 1 was subjected to closest packing in a stainless steel-made column having an inner diameter of 22 mm and a length of 150 mm. Then, the column was installed in a liquid chromatography device (a trade name: HLC-803 D equipped with a Model RI-8000 detector, manufactured by Tosoh Corporation). Subsequently, using THF solutions of a polystyrene standard substance having various molecular weights, an exclusion limit was obtained from their elution volumes. The measurement was carried out at a flow rate of 2 ml per minute using THF as an elute. As a result, the particles were found to have an exclusion limit of 330,000.

(2) Immobilization of Compound Containing Alcoholic OH Group on the Outer Surfaces of Porous Particles:

In an agitating blade-equipped 500-ml separable flask 30.0 g of the porous particles as produced in Production Example 1 and dried, 138.0 g of pure water, and 42.0 g of Polyethylene Glycol 1000 (molecular weight: about 1,000, made by Wako Pure Chemical Industries, Ltd.) were added, and the mixture was heated while agitating such that the inner temperature became 80° C. About one hour after the heating, it was confirmed that the inner temperature was kept at 80° C., and 14.3 g of a 48% NaOH aqueous solution was added. The mixture was agitated at 80° C. for 15 hours. Fifteen hours after the agitation, the agitation under heating was stopped, and the gel was transferred on a filter and washed repeatedly with pure water at 60° C. until the filtrates had become at a neutral pH. Subsequently, the residue on the filter was washed thrice with dioxane. Thereafter, a solution content of dioxane in the residue was obtained by a Kett moisture meter upon heating at 120° C. for 15 minutes. As a result, the solution content was 63.1%. A residual Cl content of the porous adsorbent was measured by an elemental analysis method. A value obtained by dividing a difference from the original Cl content by the original Cl content was defined as a degree of partial hydrophilization. As a result, the porous adsorbent was found to have a degree of partial hydrophilization of 6.8%.

(3) Amination of the Inner Surface:

Next, an amination reaction with trimethylamine was carried out. First of all, 54.2 g of the thus produced partially hydrophilized, dioxane-containing adsorbent and 70 g of a 30% trimethylamine aqueous solution were weighed in an agitating blade-equipped 300-ml autoclave, and the mixture was agitated at room temperature for 30 minutes and then heated at 80° C. for 7 hours. Thereafter, the adsorbent was washed with warm water at 50° C. The thus treated adsorbent was brought into contact with an NaOH aqueous solution to convert into an OH type, followed by titration with 0.5N HCl. The adsorbent was found to have an ion exchange capacity of 0.41 meq/ml-gel.

(4) Measurement of Adsorption Capacity for Blue Dextran:

In a previously water-filled column equipped with a bottom plug and a filter was preciously weighed and filled 1 ml of the adsorbent having the compound containing alcoholic OH group immobilized on the outer surface thereof. Subsequently, the adsorbent was washed with a 0.9% NaCl aqueous solution, and 1 ml of an aqueous solution of 2.5 mg of Blue Dextran (a trade name of Pharmacia Corporation, molecular weight: 2,000,000) in 1 ml of a 0.9% NaCl aqueous solution was preciously weighed and poured into the column. Then, a 0.9% NaCl solution was additionally added dropwise to the column so as to adjust the amount of the passed solution such that it was 10 ml.

The amount of Blue Dextran in the passed solution was measured by a spectrophotometer having a wavelength of 615 nm, and an adsorption amount to the dual surface adsorbent was calculated. As a result, it was 0.18 mg/ml-gel. It was confirmed from this result that the outer surface of the adsorbent was immobilized by the alcoholic compound.

(5) Measurement of Adsorption Capacity for Heparin:

One ml of the dual surface adsorbent whose inner surface was aminated was preciously weighed in a previously water-filled column equipped with a bottom plug and a filter and filled in a spontaneous sedimentation state therein. Subsequently, the adsorbent was washed with an NaCl solution. Next, 3 ml of a heparin solution at a concentration of 30 mg/ml in a 0.9% NaCl aqueous solution was preciously collected and poured into the column. The column was mildly shaken for 1.5 hours, and a supernatant of the column was collected and analyzed. A 50 mM sodium sulfate aqueous solution elute was made to flow through a liquid chromatography device (installed with a column having an inner diameter of 7.8 mm and a length of 30 cm, having TSK Gel α-3000 (a trade name, made by Tosoh Corporation) filled therein) provided with a differential refractometer (a trade name: RI-8020, made by Tosoh Corporation) as a detector at a flow rate of 0.75 ml per minute. A calibration curve was prepared from a heparin solution at a known concentration, and an adsorption capacity for heparin was obtained from a heparin-eluted peak area. As a result, the adsorption capacity for heparin was found to be 39 mg/ml-gel.

EXAMPLE 2

(1) Immobilization of Compound Containing Alcoholic OH Group on the Outer Surfaces of Porous Particles:

A partially hydrophilized adsorbent was produced in the same manner as in Example 1, except for replacing the Polyethylene Glycol 1000 as used in Example 1 by Polyethylene Glycol 3000 (molecular weight: 3,000, made by Wako Pure Chemical Industries, Ltd.). This adsorbent was found to have a solution content of dioxane of 61.8% and a degree of partial hydrophilization of 6.1%.

(2) Amination of the Inner Surface:

A porous adsorbent whose inner surface was aminated was produced in the same manner as in Example 1, except for using 52.4 g of the dioxane-containing, partially hydrophilized adsorbent as produced above. An ion exchange capacity of the adsorbent was measured. As a result, it was 0.43 meq/ml-gel.

(3) Measurement of Adsorption Capacity for Blue Dextran:

Using the adsorbent having the compound containing alcoholic OH group immobilized thereto as produced above, the same procedures as in Example 1 were followed to obtain an adsorption capacity for Blue Dextran. As a result, it was found to be 0.16 mg/ml-gel.

(4) Measurement of Adsorption Capacity for Heparin:

Using the adsorbent whose inner surface was aminated as produced above, the same procedures as in Example 1 were followed to obtain an adsorption capacity for heparin. As a result, it was found to be 33 mg/ml-gel.

EXAMPLE 3

(1) Immobilization of Compound Containing Alcoholic OH Group on the Outer Surfaces of Porous Particles:

A partially hydrophilized adsorbent was produced in the same manner as in Example 1, except for replacing the Polyethylene Glycol 1000 as used in Example 1 by ditrimethylolethane. This adsorbent was found to have a solution content of dioxane of 63.4% and a degree of partial hydrophilization of 6.9%.

(2) Amination of the Inner Surface:

A porous adsorbent whose inner surface was aminated was produced in the same manner as in Example 1, except for using 52.4 g of the dioxane-containing, partially hydrophilized adsorbent as produced above. An ion exchange capacity of the adsorbent was measured to be 0.38 meq/ml-gel.

(3) Measurement of Adsorption Capacity for Blue Dextran:

Using the adsorbent having the compound containing alcoholic OH group immobilized thereto as produced above, the same procedures as in Example 1 were followed to obtain an adsorption capacity for Blue Dextran. As a result, it was found to be 0.16 mg/ml-gel.

(4) Measurement of Adsorption Capacity for Heparin:

Using the adsorbent whose inner surface was aminated as produced above, the same procedures as in Example 1 were followed to obtain an adsorption capacity for heparin. As a result, it was found to be 43 mg/ml-gel.

EXAMPLE 4

(1) Measurement of Exclusion Limit:

Using a gel slurry THF solution of the porous particles as produced in Production Example 2, the same procedures as in Example 1 were followed to obtain an exclusion limit. As a result, the particles were found to have an exclusion limit of 320,000.

(2) Immobilization of Compound Containing Alcoholic OH Group on the Outer Surfaces of Porous Particles:

The same procedures as in Example 1 were followed, except for replacing the porous particles as produced in Production Example 1 and dried and the Polyethylene Glycol 1000 by the porous particles as produced in Production Example 2 and dried and Polyethylene Glycol 2000 (molecular weight: 2,000, made by Wako Pure Chemical Industries, Ltd.), respectively. The thus produced particles were found to have a solution content of dioxane of 60.1% and a degree of partial hydrophilization of 5.9%.

(3) Amination of the Inner Surface:

A porous adsorbent whose inner surface was aminated was produced in the same manner as in Example 1, except for using 50.1 g of the partially hydrophilized adsorbent as produced above in place of the partially hydrophilized adsorbent as produced in Example 1. An ion exchange capacity of the adsorbent was measured to be 0.37 meq/ml-gel.

(4) Measurement of Adsorption Capacity for Blue Dextran:

Using the adsorbent having the compound containing alcoholic OH group immobilized thereto as produced above, the same procedures as in Example 1 were followed to obtain an adsorption capacity for Blue Dextran. As a result, it was found to be 0.17 mg/ml-gel.

(5) Measurement of Adsorption Capacity for Heparin:

Using the adsorbent whose inner surface was aminated as produced above, the same procedures as in Example 1 were followed to obtain an adsorption capacity for heparin. As a result, it was found to be 40 mg/ml-gel.

EXAMPLE 5

(1) Immobilization of Compound Containing Alcoholic OH Group on the Outer Surfaces of Porous Particles:

A partially hydrophilized adsorbent was produced in the same manner as in Example 4, except for replacing the Polyethylene Glycol 2000 as used in Example 4 by Polyethylene Glycol 6000 (molecular weight: 6,000, made by Wako Pure Chemical Industries, Ltd.). This adsorbent was found to have a solution content of dioxane of 59.8% and a degree of partial hydrophilization of 5.7%.

(2) Amination of the Inner Surfaces of Pores:

A porous adsorbent whose inner surface was aminated was produced in the same manner as in Example 4, except for using 49.8 g of the partially hydrophilized adsorbent as produced above. An ion exchange capacity of the adsorbent was measured to be 0.34 meq/ml-gel.

(3) Measurement of Adsorption Capacity for Blue Dextran:

Using the adsorbent having the compound containing alcoholic OH group immobilized thereto as produced above, the same procedures as in Example 1 were followed to obtain an adsorption capacity for Blue Dextran. As a result, it was found to be 0.16 mg/ml-gel.

(4) Measurement of Adsorption Capacity for Heparin:

Using the adsorbent whose inner surface was aminated as produced above, the same procedures as in Example 1 were followed to obtain an adsorption capacity for heparin. As a result, it was found to be 30 mg/ml-gel.

EXAMPLE 6

In producing a partially hydrophilized adsorbent using the porous particles as obtained in Production Example 3, basic physical properties of the particles were measured.

(1) Measurement of Epoxy Content in Porous Particles:

In a ground stopper-equipped Erlenmeyer flask having a volume of 200 ml was charged about 2 g of the porous particles as obtained in Production Example 3 and weighed. Next, 25 ml of an approximately 0.2 M-hydrochloric acid/dioxane solution was preciously added, and after placing an agitator, the mixture was mildly agitated at room temperature for 3 hours. Thereafter, 50 ml of ethyl alcohol and 1 ml of a phenolphthalein solution were added to the reaction mixture, and a residual amount of hydrochloric acid was obtained using a 0.1 M-NaOH solution through titration. Simultaneously, a concentration of hydrochloric acid in the approximately 0.2 M-hydrochloric acid/dioxane solution was obtained using 0.1M-NaOH. Also, about 2 g of the porous particles were charged and weighed in a ground stopper-equipped Erlenmeyer flask having a volume of 200 ml. After adding 75 ml of ethyl alcohol, the mixture was agitated at room temperature for about 30 minutes, and the reaction mixture was titrated with a 0.1M-NaOH solution using a phenolphthalein solution as an indicator, to obtain an acid value in the measured particles. Thus, an epoxy content was obtained from the residual amount of hydrochloric acid, the acid value, and the solution content of the particles. As a result, the epoxy content was found to be 5.21 mmoles per gram of the dried gel.

(2) Measurement of Exclusion Limit and Porosity:

An exclusion limit was obtained in a manner exactly the same as in Example 1-(1), except for using a gel slurry THF solution of the porous particles as obtained in Production Example 3. As a result, the exclusion limit of the particles was 320,000.

(3) Immobilization of Compound Containing Alcoholic OH Group on the Outer Surfaces of Porous Particles:

The porous particles as obtained in Production Example 3 were thoroughly dried, and 30 g of the dried particles were immersed in 200 g of a xylene solution, followed by allowing to stand for impregnation for 24 hours upon heating at 45° C. A degree of impregnation of xylene was 51.9%. After filtering out the xylene solution by a filter, 109.8 g of water and 37.8 g of Polyethylene Glycol 1000 (molecular weight: about 1,000, made by Wako Pure Chemical Industries, Ltd.) were weighed in a separable flask, and the temperature was elevated at 70° C. while mixing by an agitator. At the stage when the inner temperature reached 70° C., 14.3 g of a 48% NaOH aqueous solution was added, and the mixture was allowed to react for 15 hours. Then, the reaction mixture was transferred on the filter and well washed with warm water. Subsequently, the residue was washed with dioxane to remove the solvent. Thereafter, a solution content of dioxane in the residue was obtained by a Kett moisture meter upon heating at 120° C. for 15 minutes. As a result, the solution content of dioxane was 57.1%. A residual epoxy content of the partially hydrophilized porous adsorbent was measured in the measurement method as described above. As a result, the partially hydrophilized porous adsorbent was found to have a residual epoxy content of 4.94 mmoles per gram of the dried gel and a degree of partial hydrophilization of 5.2%.

(4) Amination of the Inner Surfaces of Pores:

The partially hydrophilized porous adsorbent as obtained above in (3) was subsequently subjected to an amination reaction with trimethylamine. First of all, 37.3 g of the partially hydrophilized porous adsorbent and 97.7 g of pure water were weighed in an agitating blade-equipped 500-ml separable flask, and the mixture was agitated at room temperature for 30 minutes. Next, 11.1 g of trimethylamine hydrochloride was added, and the mixture was agitated for an additional 30 minutes. Then, 4.5 g of sodium hydroxide was added, and the mixture was agitated for 30 minutes. Thirty minutes after the agitation, the flask was heated such that the inner temperature reached 40° C., and after reaching 40° C., the mixture was agitated for an additional 2 hours. Two hour after the agitation, the heating was stopped, and the reaction mixture was cooled. At the time when the inner temperature decreased to 25° C. or lower, 19.0 g of a 6N-hydrochloric acid solution was added dropwise such that the inner temperature did not increase to 30° C. or higher. After the dropwise addition, the inner temperature was 27.4° C., and a pH was 8.3. The agitation was stopped, and the resulting particles were transferred on a filter and washed four times with 600 ml of pure water at 60° C. The thus obtained dual surface adsorbent was brought into contact with an NaOH aqueous solution to convert into an OH type, followed by titration with 0.5N HCl. The adsorbent was found to have an ion exchange capacity of 0.38 meq/ml-gel.

(5) Measurement of Adsorption Capacity for Blue Dextran:

An amount of residual Blue Dextran was measured in a manner exactly the same as in Example 1-(4), except for using the partially hydrophilized porous adsorbent having the compound containing alcoholic OH group immobilized on the outer surface thereof as obtained above in (3) in a previously water-filled column equipped with a bottom plug and a filter. The adsorption capacity for Blue Dextran as measured above was 0.18 mg/ml-gel, and it was confirmed that the alcoholic compound was immobilized on the outer surface of the adsorbent.

(6) Measurement of Adsorption Capacity for Heparin:

An adsorption capacity for heparin was obtained in a manner exactly the same as in Example 1-(5), except for using the dual surface adsorbent whose inner surface was aminated as obtained above in (4) in a previously water-filled column equipped with a bottom plug and a filter. As a result, the adsorption capacity for heparin was 40 mg/ml-gel.

EXAMPLE 7

(1) Immobilization of Compound Containing Alcoholic OH Group on the Outer Surfaces of Porous Particles:

A partially hydrophilized porous adsorbent was produced in the same manner as in Example 6-(3), except for replacing the Polyethylene Glycol 1000 by Polyethylene Glycol 2000 (molecular weight: about 2,000, made by Wako Pure Chemical Industries, Ltd.). This adsorbent was found to have a solution content of dioxane of 53.7%, a residual epoxy content of 4.90 mmoles per gram of the dried gel, and a degree of partial hydrophilization of 6.0%.

(2) Amination of the Inner Surfaces of Pores:

The partially hydrophilized porous adsorbent having the compound containing alcoholic OH group immobilized on the outer surface thereof as obtained above in (1) was subjected to an amination reaction with trimethylamine in the same manner as in Example 6-(4), except for using 34.6 g of the adsorbent and 100.4 g of pure water. The thus obtained dual surface adsorbent was found to have an ion exchange capacity of 0.35 meq/ml-gel.

(3) Measurement of Adsorption Capacity for Blue Dextran:

An adsorption capacity for Blue Dextran of the partially hydrophilized porous adsorbent having the compound containing alcoholic OH group immobilized on the outer surface thereof as obtained above in (1) was obtained in the same manner as in Example 6-(5). As a result, the adsorption capacity was 0.14 mg/ml-gel.

(4) Measurement of Adsorption Capacity for Heparin:

An adsorption capacity for heparin of the dual surface adsorbent whose inner surface was aminated as obtained above in (2) was obtained in the same manner as in Example 6-(6). As a result, the adsorption capacity for heparin was 37 mg/ml-gel.

EXAMPLE 8

In producing a partially hydrophilized adsorbent using the porous particles as obtained in Production Example 4, basic physical properties of the particles were measured.

(1) Measurement of Epoxy Content in Porous Particles:

An epoxy content of the porous particles was obtained in the same manner as in Example 6-(1), except for using the porous particles as obtained in Production Example 4. As a result, the epoxy content was 5.35 mmoles per gram of the dried gel.

(2) Measurement of Exclusion Limit:

A gel slurry solution of the porous particles as produced in Production Example 4 was subjected to closest packing in a glass-made column having an inner diameter of 22 mm and a length of 150 mm. Then, the column was installed in a liquid chromatography device (a trade name: HLC-803 D equipped with a Model RI-8000 detector, manufactured by Tosoh Corporation). Subsequently, using dextran having a molecular weight of 40,000,000 and pullulane as standard substances, the standard substances having various molecular weights were poured at a flow rate of 2 ml per minute. An exclusion limit was obtained from their elution volumes. As a result, the particles were found to have an exclusion limit of 350,000.

(3) Immobilization of Compound Containing Alcoholic OH Group on the Outer Surfaces of Porous Particles:

The porous particles as obtained in Production Example 4 were thoroughly dried, and 30 g of the dried particles were immersed in 200 g of a butyl acetate solution, followed by allowing to stand for impregnation for 24 hours upon heating at 45° C. A degree of impregnation of butyl acetate was 54.0%. After filtering out the butyl acetate solution by a filter, 107.0 g of water and 37.8 g of sorbitol were weighed in a separable flask, and the temperature was elevated at 70° C. while mixing by an agitator. At the stage when the inner temperature reached 70° C., 14.3 g of a 48% NaOH aqueous solution was added, and the mixture was allowed to react for 15 hours. Then, the reaction mixture was transferred on the filter and well washed with warm water. Subsequently, the residue was washed with dioxane to remove the solvent. Thereafter, a solution content of dioxane in the residue was obtained by a Kett moisture meter upon heating at 120° C.

for 15 minutes. As a result, the solution content of dioxane was 68.1%. A residual epoxy content of the partially hydrophilized porous adsorbent was measured in the measurement method as described above. As a result, the partially hydrophilized porous adsorbent was found to have a residual epoxy content of 5.00 mmoles per gram of the dried gel and a degree of partial hydrophilization of 6.5%.

(4) Amination of the Inner Surfaces of Pores:

The partially hydrophilized porous adsorbent having the compound containing alcoholic OH group immobilized on the outer surface thereof as obtained above in (3) was subjected to an amination reaction with trimethylamine in the same manner as in Example 6-(4), except for using 50.2 g of the adsorbent. The thus obtained dual surface adsorbent was found to have an ion exchange capacity of 0.33 meq/ml-gel.

(5) Measurement of Adsorption Capacity for Blue Dextran:

An adsorption capacity for Blue Dextran of the porous adsorbent having the compound containing alcoholic OH group immobilized on the outer surface thereof as obtained above in (3) was obtained in the same manner as in Example 6-(5). As a result, the adsorption capacity was 0.12 mg/ml-gel.

(6) Measurement of Adsorption Capacity for Heparin:

An adsorption capacity for heparin of the dual surface adsorbent whose inner surface was aminated as obtained above in (4) was obtained in the same manner as in Example 6-(6). As a result, the adsorption capacity for heparin was 41 mg/ml-gel.

EXAMPLE 9

(1) Immobilization of Compound Containing Alcoholic OH Group on the Outer Surfaces of Porous Particles:

In a separable flask were weighed 65.2 g of the porous particles having a degree of impregnation of butyl acetate of 54.0% as obtained in Example 8-(3), 107.0 g of water, and 37.8 g of ditriemthylolethane. Thereafter, the same procedures as in Example 8-(3) were followed to obtain a partially hydrophilized porous adsorbent having a compound containing alcoholic OH group immobilized on the outer surface thereof. This porous adsorbent was found to have a residual epoxy content of 5.06 mmoles per gram of the dried gel and a degree of partially hydrophilization of 5.4%.

(2) Amination of the Inner Surfaces of Pores:

The partially hydrophilized porous adsorbent having the compound containing alcoholic OH group immobilized on the outer surface thereof as obtained above in (1) was subjected to an amination reaction with trimethylamine in the same manner as in Example 6-(4), except for using 50.2 g of the adsorbent. The thus obtained dual surface adsorbent was found to have an ion exchange capacity of 0.39 meq/ml-gel.

(3) Measurement of Adsorption Capacity for Blue Dextran:

An adsorption capacity for Blue Dextran of the partially hydrophilized porous adsorbent having the compound containing alcoholic OH group immobilized on the outer surface thereof as obtained above in (1) was obtained in the same manner as in Example 6-(5). As a result, the adsorption capacity was 0.08 mg/ml-gel.

(4) Measurement of Adsorption Capacity for Heparin:

An adsorption capacity for heparin of the dual surface adsorbent whose inner surface was aminated as obtained above in (2) was obtained in the same manner as in Example 6-(6). As a result, the adsorption capacity for heparin was 45 mg/ml-gel.

EXAMPLE 10

In producing a partially hydrophilized porous adsorbent using the porous particles as obtained in Production Example 1, basic physical properties of the particles were measured.

(1) Measurement of Exclusion Limit:

The exclusion limit was already measured in Example 1 and is 330,000.

(2) Immobilization of Compound Containing Alcoholic OH Group on the Outer Surfaces of Porous Particles:

The porous particles as obtained in Production Example 1 were thoroughly dried, and 30 g of the dried particles were immersed in 200 g of a toluene solution, followed by allowing to stand for impregnation for 24 hours upon heating at 45° C. A degree of impregnation of toluene was 50.2%. After filtering out the toluene solution by a filter, 112.0 g of water and 37.8 g of Polyethylene Glycol 3000 (molecular weight: about 3,000, made by Wako Pure Chemical Industries, Ltd.) were weighed in a separable flask, and the temperature was elevated at 70° C. while mixing by an agitator. At the stage when the inner temperature reached 70° C., 18.8 g of a 48% NaOH aqueous solution was added, and the mixture was allowed to react for 10 hours. Then, the reaction mixture was transferred on the filter and well washed with warm water. Subsequently, the residue was washed with dioxane to remove the solvent. Thereafter, a solution content of dioxane in the residue was obtained by a Kett moisture meter upon heating at 120° C. for 15 minutes. As a result, the solution content of dioxane was 57.3%. After drying the partially hydrophilized porous adsorbent, its residual Cl amount was obtained, from which a degree of hydrophilization was calculated. As a result, the partially hydrophilized porous adsorbent was found to have degree of partial hydrophilization of 6.5%.

(3) Amination of the Inner Surfaces of Pores:

The partially hydrophilized porous adsorbent as obtained above in (2) was subsequently subjected to an amination reaction with trimethylamine. First of all, 46.8 g of the partially hydrophilized porous adsorbent and 70 g of a 30% trimethylamine aqueous solution were weighed in an agitating blade-equipped 300-ml autoclave, and the mixture was agitated at room temperature for 30 minutes and then treated at 80° C. for 7 hours. Thereafter, the adsorbent was washed with warm water at 50° C. The thus obtained adsorbent was brought into contact with an NaOH aqueous solution to convert into an OH type, followed by titration with 0.5N HCl. The thus obtained dual surface adsorbent was found to have an ion exchange capacity of 0.38 meq/ml-gel.

(4) Measurement of Adsorption Capacity for Blue Dextran:

An adsorption capacity for Blue Dextran of the partially hydrophilized porous adsorbent having the compound containing alcoholic OH group immobilized on the outer surface thereof as obtained above in (2) was obtained in the same manner as in Example 6-(5). As a result, the adsorption capacity was 0.16 mg/ml-gel.

(5) Measurement of Adsorption Capacity for Heparin:

An adsorption capacity for heparin of the dual surface adsorbent whose inner surface was aminated as obtained above in (3) was obtained in the same manner as in Example 6-(6). As a result, the adsorption capacity for heparin was 35 mg/ml-gel.

EXAMPLE 11

(1) Immobilization of Compound Containing Alcoholic OH Group on the Outer Surfaces of Porous Particles:

In a separable flask were weighed 60.2 g of the porous particles having a degree of impregnation of toluene of 50.2% as obtained in Example 10-(2), 112.0 g of water, and 37.8 g of maltitol. Thereafter, the same procedures as in Example 10-(2) were followed to obtain a partially hydrophilized porous adsorbent having a compound containing alcoholic OH group immobilized on the outer surface thereof. This partially hydrophilized porous adsorbent was found to have a a degree of partially hydrophilization of 5.5%.

(2) Amination of the Inner Surfaces of Pores:

Using 39.8 g of the partially hydrophilized porous adsorbent having the compound containing alcoholic OH group immobilized on the outer surface thereof as obtained above in (1), an amination reaction with trimethylamine was subsequently carried out. First of all, the partially hydrophilized porous adsorbent having a dioxane content of 59.8% as obtained above was subjected to an amination reaction with trimethylamine in the same manner as in Example 10-(3), except for using 39.8 g of the adsorbent. The thus obtained dual surface adsorbent was found to have an ion exchange capacity of 0.39 meq/ml-gel.

(3) Measurement of Adsorption Capacity for Blue Dextran:

An adsorption capacity for Blue Dextran of the partially hydrophilized porous adsorbent having the compound containing alcoholic OH group immobilized on the outer surface thereof as obtained above in (1) was obtained in the same manner as in Example 6-(5). As a result, the adsorption capacity was 0.19 mg/ml-gel.

(4) Measurement of Adsorption Capacity for Heparin:

An adsorption capacity for heparin of the dual surface adsorbent whose inner surface was aminated as obtained above in (2) was obtained in the same manner as in Example 6-(6). As a result, the adsorption capacity for heparin was 40 mg/ml-gel.

EXAMPLE 12

In producing a dual surface adsorbent using the porous particles as obtained in Production Example 4, basic physical properties of the particles were measured.

(1) Measurement of Epoxy Content in Porous Particles:

An epoxy content of the above-described porous particles containing dioxane was obtained in a manner exactly the same manner as in Example 6-(1), except for using about 2 g of the porous particles. As a result, the epoxy content was 5.33 mmoles per gram of the dried gel.

(2) Exclusion Limit and Porosity:

An exclusion limit was obtained in a manner exactly the same as in Example 8-(2), except for using a gel slurry aqueous solution of the above-described porous particles containing water. Also, a porosity was obtained from elution volumes of dextran and ethylene glycol. As a result, the particles were found to have an exclusion limit of 350,000 and a porosity of 60%.

(3) Immobilization of Compound Containing Alcoholic OH Group on the Outer Surfaces of Porous Particles:

In an agitating blade-equipped 500-ml separable flask were weighed 76.7 g of the above-described porous particles having a moisture content of 60.9%, 95.5 g of pure water, and 37.8 g of diethylene glycol, and the mixture was heated while agitating such that the inner temperature became 70° C. About one hour after the heating, it was confirmed that the inner temperature was kept at 70° C., and 14.3 g of a 48% NaOH aqueous solution was added. The mixture was agitated at 70° C. for 15 hours. Fifteen hours after the agitation, the agitation under heating was stopped, and the gel was transferred on a filter and washed repeatedly with pure water at 60° C. until the filtrates had become at a neutral pH. Subsequently, the residue on the filter was washed thrice with dioxane. Thereafter, a solution content of dioxane in the residue was obtained by a Kett moisture meter under the same condition as described above. As a result, the solution content of dioxane was 73.1%. A residual epoxy content of the porous adsorbent was measured by the measurement method as described above. As a result, the porous adsorbent was found to have a residual epoxy content of 4.96 mmoles per gram of the dried gel and a degree of partial hydrophilization of 6.9%.

(4) Amination of the Inner Surfaces of Pores:

Subsequently, an amination reaction with trimethylamine was carried out. First of all, 59.5 g of the partially hydrophilized, dioxane-containing porous adsorbent and 155.8 g of pure water were weighed in an agitating blade-equipped 500-ml separable flask, and the mixture was agitated at room temperature for 30 minutes. Next, 11.1 g of trimethylamine hydrochloride was added, and the mixture was agitated for an additional 30 minutes. Then, 4.5 g of sodium hydroxide was added, and the mixture was agitated for 30 minutes. Thirty minutes after the agitation, the flask was heated such that the inner temperature reached 40° C., and after reaching 40° C., the mixture was agitated for an additional 2 hours. Two hour after the agitation, the heating was stopped, and the reaction mixture was cooled such that the inner temperature became 30° C. or lower. At the time when the inner temperature decreased to 25° C. or lower, 19.0 g of a 6N-hydrochloric acid aqueous solution was added dropwise such that the inner temperature did not increase to 30° C. or higher. After the dropwise addition of hydrochloric acid, the inner temperature was 27.4° C., and a pH was 8.3. The agitation was stopped, and the gel was transferred on a filter and washed four times with 600 ml of pure water at 60° C. The thus obtained adsorbent was brought into contact with an NaOH aqueous solution to convert into an OH type, followed by titration with 0.5N HCl. The adsorbent was found to have an ion exchange capacity of 0.37 meq/ml-gel.

(5) Measurement of Adsorption Capacity for Blue Dextran:

An amount of residual Blue Dextran was measured in a manner exactly the same as in Example 1-(4), except for using the above-described adsorbent having the compound containing alcoholic OH group immobilized on the outer surface thereof in a previously water-filled column equipped with a bottom plug and a filter, and an adsorption amount on the dual surface adsorbent was measured. As a result, the adsorption capacity was 0.13 mg/ml-gel. It was confirmed from this result that the alcoholic compound was immobilized on the outer surface of the adsorbent.

(6) Measurement of Adsorption Capacity for Heparin:

An adsorption capacity for heparin was obtained in the same manner as in Example 1-(5), except for using the adsorbent whose inner surface was aminated in a previously water-filled column equipped with a bottom plug and a filter. As a result, the adsorption capacity for heparin was 46 mg/ml-gel.

EXAMPLE 13

(1) Immobilization of Compound Containing Alcoholic OH Group on the Outer Surfaces of Porous Particles:

In an agitating blade-equipped 500-ml separable flask were weighed 76.7 g of the moisture-containing porous particles as obtained in Production Example 4, 95.5 g of pure water, and 37.8 g of Polyethylene Glycol 400 (molecular weight: 400, made by Wako Pure Chemical Industries, Ltd.). Thereafter, exactly the same procedures as in Example 12 were followed. As a result, the adsorbent was found to have a solution content of dioxane of 70.5%, a residual epoxy content of 4.98 mmoles per gram of the dried gel and a degree of partial hydrophilization of 6.6%.

(2) Amination of the Inner Surfaces of Pores:

Subsequently, an amination reaction with trimethylamine was carried out. The same procedures as in Example 12 were followed, except for using 54.2 g of the partially hydrophilized, dioxane-containing porous adsorbent as described above. The thus obtained adsorbent was found to have an ion exchange capacity of 0.35 meq/ml-gel.

(3) Measurement of Adsorption Capacity for Blue Dextran:

Using the above-described adsorbent having the compound containing alcoholic OH group immobilized on the outer surface thereof, an adsorption capacity for Blue Dextran was measured in the same manner as in Example 12. As a result, the adsorption capacity was 0.12 mg/ml-gel.

(4) Measurement of Adsorption Capacity for Heparin:

Using the adsorbent whose inner surface was aminated, an adsorption capacity for heparin was obtained in the same manner as in Example 12. As a result, the adsorption capacity for heparin was 45 mg/ml-gel.

EXAMPLE 14

(1) Immobilization of Compound Containing Alcoholic OH Group on the Outer Surfaces of Porous Particles:

In an agitating blade-equipped 500-ml separable flask were weighed 76.7 g of the moisture-containing particles as obtained in Production Example 4, 95.5 g of pure water, and 37.8 g of Polyethylene Glycol 600 (molecular weight: 600, made by Wako Pure Chemical Industries, Ltd.) Thereafter, exactly the same procedures as in Example 12 were followed. As a result, the adsorbent was found to have a solution content of dioxane of 72.1%, a residual epoxy content of 4.98 mmoles per gram of the dried gel and a degree of partial hydrophilization of 6.6%.

(2) Amination of the Inner Surfaces of Pores:

Subsequently, an amination reaction with trimethylamine was carried out. The same procedures as in Example 12 were followed, except for using 57.3 g of the partially hydrophilized, dioxane-containing porous adsorbent as described above. The thus obtained adsorbent was found to have an ion exchange capacity of 0.38 meq/ml-gel.

(3) Measurement of Adsorption Capacity for Blue Dextran:

The same procedures as in Example 12 were followed to obtain an adsorption capacity for Blue Dextran of the above-described adsorbent having the compound containing alcoholic OH group immobilized on the outer surface thereof. As a result, the adsorption capacity was 0.07 mg/ml-gel.

(4) Measurement of Adsorption Capacity for Heparin:

Using the adsorbent whose inner surface was aminated, an adsorption capacity for heparin was obtained in the same manner as in Example 12. As a result, the adsorption capacity for heparin was 41 mg/ml-gel.

EXAMPLE 15

(1) Immobilization of Compound Containing Alcoholic OH Group on the Outer Surfaces of Porous Particles:

In an agitating blade-equipped 500-ml separable flask were weighed 76.7 g of the moisture-containing particles as obtained in Production Example 4, 95.5 g of pure water, and 37.8 g of sorbitol. Thereafter, exactly the same procedures as in Example 12 were followed. As a result, the adsorbent was found to have a solution content of dioxane of 74.5%, a residual epoxy content of 4.96 mmoles per gram of the dried gel and a degree of partial hydrophilization of 6.9%.

(2) Amination of the Inner Surfaces of Pores:

Subsequently, an amination reaction with trimethylamine was carried out. The same procedures as in Example 12 were followed, except for using 62.7 g of the partially hydrophilized, dioxane-containing porous adsorbent as described above. The thus obtained adsorbent was found to have an ion exchange capacity of 0.37 meq/ml-gel.

(3) Measurement of Adsorption Capacity for Blue Dextran:

The same procedures as in Example 12 were followed to obtain an adsorption capacity for Blue Dextran of the above-described adsorbent having the compound containing alcoholic OH group immobilized on the outer surface thereof. As a result, the adsorption capacity was 0.12 mg/ml-gel.

(4) Measurement of Adsorption Capacity for Heparin:

Using the adsorbent whose inner surface was aminated, an adsorption capacity for heparin was obtained in the same manner as in Example 12. As a result, the adsorption capacity for heparin was 46 mg/ml-gel.

EXAMPLE 16

(1) Immobilization of Compound Containing Alcoholic OH Group on the Outer Surfaces of Porous Particles:

In an agitating blade-equipped 500-ml separable flask were weighed 76.7 g of the moisture-containing particles as obtained in Production Example 4, 95.5 g of pure water, and 37.8 g of glycerin. Thereafter, exactly the same procedures as in Example 12 were followed. As a result, the adsorbent was found to have a solution content of dioxane of 71.5%, a residual epoxy content of 5.02 mmoles per gram of the dried gel and a degree of partial hydrophilization of 5.8%.

(2) Amination of the Inner Surfaces of Pores:

Subsequently, an amination reaction with trimethylamine was carried out. The same procedures as in Example 12 were followed, except for using 56.1 g of the partially hydrophilized, dioxane-containing porous adsorbent as described above. The thus obtained adsorbent was found to have an ion exchange capacity of 0.39 meq/ml-gel.

(3) Measurement of Adsorption Capacity for Blue Dextran:

The same procedures as in Example 12 were followed to obtain an adsorption capacity for Blue Dextran of the above-described adsorbent having the compound containing alcoholic OH group immobilized on the outer surface thereof. As a result, the adsorption capacity was 0.13 mg/ml-gel.

(4) Measurement of Adsorption Capacity for Heparin:

Using the adsorbent whose inner surface was aminated, an adsorption capacity for heparin was obtained in the same manner as in Example 12. As a result, the adsorption capacity for heparin was 46 mg/ml-gel.

EXAMPLE 17

(1) Immobilization of Compound Containing Alcoholic OH Group on the Outer Surfaces of Porous Particles:

In an agitating blade-equipped 500-ml separable flask were weighed 76.7 g of the moisture-containing particles as obtained in Production Example 4, 78.7 g of pure water, and 54.6 g of Polyethylene Glycol 600 (molecular weight: 600, made by Wako Pure Chemical Industries, Ltd.). Thereafter, exactly the same procedures as in Example 12 were followed. As a result, the adsorbent was found to have a solution content of dioxane of 73.3%, a residual epoxy content of 4.81 mmoles per gram of the dried gel and a degree of partial hydrophilization of 9.8%.

(2) Amination of the Inner Surfaces of Pores:

Subsequently, an amination reaction with trimethylamine was carried out. The same procedures as in Example 12 were followed, except for using 59.9 g of the partially hydrophilized, dioxane-containing porous adsorbent as described above. The thus obtained adsorbent was found to have an ion exchange capacity of 0.33 meq/ml-gel.

(3) Measurement of Adsorption Capacity for Blue Dextran:

The same procedures as in Example 12 were followed to obtain an adsorption capacity for Blue Dextran of the above-described adsorbent having the compound containing alcoholic OH group immobilized on the outer surface thereof. As a result, the adsorption capacity was 0.08 mg/ml-gel.

(4) Measurement of Adsorption Capacity for Heparin:

Using the adsorbent whose inner surface was aminated, an adsorption capacity for heparin was obtained in the same manner as in Example 12. As a result, the adsorption capacity for heparin was 37 mg/ml-gel.

EXAMPLE 18

(1) Measurement of Exclusion Limit:

A gel slurry THF solution of the porous particles as produced in Production Example 3 was subjected to closest packing in a glass-made column having an inner diameter of 22 mm and a length of 150 mm. Then, the column was installed in a liquid chromatography device (a trade name: HLC-803 D equipped with a Model RI-8000 detector, manufactured by Tosoh Corporation). THF was used as an elute. Subsequently, using standard polystyrenes having various molecular weights, each standard substance was poured at a flow rate of 2 ml per minute, and an exclusion limit was obtained from elution volumes thereof. As a result, the porous particles of Production Example 3 were found to have an exclusion limit of 320,000 and a porosity of 63%.

(2) Immobilization of Compound Containing Alcoholic OH Group on the Outer Surfaces of Porous Particles:

In an agitating blade-equipped 500-ml separable flask were weighed 64.6 g of the particles having a moisture content of 45.8% as obtained in Production Example 3, 72.6 g of pure water, and 37.8 g of sorbitol. Thereafter, exactly the same procedures as in Example 12 were followed. As a result, the adsorbent was found to have a solution content of dioxane of 54.5%, a residual epoxy content of 4.81 mmoles per gram of the dried gel and a degree of partial hydrophilization of 7.7%.

An epoxy content in the particles of Production Example 3 was obtained in the same manner as in Example 12. As a result, the epoxy content was 5.21 mmoles per gram of the dried gel.

(3) Amination of the Inner Surfaces of Pores:

Subsequently, an amination reaction with trimethylamine was carried out. The same procedures as in Example 12 were followed, except for using 35.2 g of the dioxane-containing porous adsorbent as described above. The thus obtained adsorbent was found to have an ion exchange capacity of 0.33 meq/ml-gel.

(4) Measurement of Adsorption Capacity for Blue Dextran:

The same procedures as in Example 12 were followed to obtain an adsorption capacity for Blue Dextran of the above-described adsorbent having the compound containing alcoholic OH group immobilized on the outer surface thereof. As a result, the adsorption capacity was 0.15 mg/ml-gel.

(5) Measurement of Adsorption Capacity for Heparin:

Using the adsorbent whose inner surface was aminated, an adsorption capacity for heparin was obtained in the same manner as in Example 12. As a result, the adsorption capacity for heparin was 41 mg/ml-gel.

EXAMPLE 19

(1) Immobilization of Compound Containing Alcoholic OH Group on the Outer Surfaces of Porous Particles:

In an agitating blade-equipped 500-ml separable flask were weighed 64.6 g of the particles having a moisture content of 45.8% as obtained in Production Example 3, 72.6 g of pure water, and 37.8 g of Polyethylene Glycol 600 (molecular weight: 600, made by Wako Pure Chemical Industries, Ltd.). Thereafter, exactly the same procedures as in Example 12 were followed. As a result, the adsorbent was found to have a solution content of dioxane of 52.7%, a residual epoxy content of 4.82 mmoles per gram of the dried gel and a degree of partial hydrophilization of 7.5%.

(2) Amination of the Inner Surfaces of Pores:

Subsequently, an amination reaction with trimethylamine was carried out. The same procedures as in Example 12 were followed, except for using 33.8 g of the dioxane-containing porous adsorbent as described above. The thus obtained adsorbent was found to have an ion exchange capacity of 0.35 meq/ml-gel.

(3) Measurement of Adsorption Capacity for Blue Dextran:

The same procedures as in Example 12 were followed to obtain an adsorption capacity for Blue Dextran of the above-described adsorbent having the compound containing alcoholic OH group immobilized on the outer surface thereof. As a result, the adsorption capacity was 0.10 mg/ml-gel.

(4) Measurement of Adsorption Capacity for Heparin:

Using the adsorbent whose inner surface was aminated, an adsorption capacity for heparin was obtained in the same manner as in Example 12. As a result, the adsorption capacity for heparin was 39 mg/ml-gel.

EXAMPLE 20

(1) Immobilization of Compound Containing Alcoholic OH Group on the Outer Surfaces of Porous Particles:

In an agitating blade-equipped 500-ml separable flask were weighed 64.6 g of the particles having a moisture content of 45.8% as obtained in Production Example 3, 72.6 g of pure water, and 37.8 g of Polyethylene Glycol 3400 (molecular weight: 3400, made by Wako Pure Chemical Industries, Ltd.). Thereafter, exactly the same procedures as in Example 12 were followed. As a result, the adsorbent was found to have a solution content of dioxane of 51.3%, a residual epoxy content of 4.83 mmoles per gram of the dried gel and a degree of partial hydrophilization of 7.3%.

(2) Amination of the Inner Surfaces of Pores:

Subsequently, an amination reaction with trimethylamine was carried out. The same procedures as in Example 12 were followed, except for using 32.9 g of the dioxane-containing porous adsorbent as described above. The thus obtained adsorbent was found to have an ion exchange capacity of 0.37 meq/ml-gel.

(3) Measurement of Adsorption Capacity for Blue Dextran:

The same procedures as in Example 12 were followed to obtain an adsorption capacity for Blue Dextran of the above-described adsorbent having the compound containing alcoholic OH group immobilized on the outer surface thereof. As a result, the adsorption capacity was 0.08 mg/ml-gel.

(4) Measurement of Adsorption Capacity for Heparin:

Using the adsorbent whose inner surface was aminated, an adsorption capacity for heparin was obtained in the same manner as in Example 12. As a result, the adsorption capacity for heparin was 35 mg/ml-gel.

EXAMPLE 21

(1) Measurement of Exclusion Limit:

Using a gel slurry THF solution of the particles as obtained in Production Example 5, the same procedures as in Example 18 were followed to obtain an exclusion limit. As a result, the porous particles of Production Example 5 were found to have an exclusion limit of 370,000.

(2) Immobilization of Compound Containing Alcoholic OH Group on the Outer Surfaces of Porous Particles:

In an agitating blade-equipped 500-ml separable flask were weighed 64.6 g of the particles having a moisture content of 45.8% as obtained in Production Example 5, 72.6 g of pure water, and 37.8 g of Polyethylene Glycol 4000 (molecular weight: 4000, made by Wako Pure Chemical Industries, Ltd.). Thereafter, exactly the same procedures as in Example 12 were followed. As a result, the adsorbent was found to have a solution content of dioxane of 59.8%, a residual epoxy content of 4.90 mmoles per gram of the dried gel and a degree of partial hydrophilization of 7.5%.

An epoxy content in the particles of Production Example 5 was obtained in the same manner as in Example 12. As a result, the epoxy content was 5.30 mmoles per gram of the dried gel.

(3) Amination of the Inner Surfaces of Pores:

Subsequently, an amination reaction with trimethylamine was carried out. The same procedures as in Example 12 were followed, except for using 39.8 g of the dioxane-containing porous adsorbent as described above. The thus obtained adsorbent was found to have an ion exchange capacity of 0.38 meq/ml-gel.

(4) Measurement of Adsorption Capacity for Blue Dextran:

The same procedures as in Example 12 were followed to obtain an adsorption capacity for Blue Dextran of the above-described adsorbent having the compound containing alcoholic OH group immobilized on the outer surface thereof. As a result, the adsorption capacity was 0.08 mg/ml-gel.

(5) Measurement of Adsorption Capacity for Heparin:

Using the adsorbent whose inner surface was aminated, an adsorption capacity for heparin was obtained in the same manner as in Example 12. As a result, the adsorption capacity for heparin was 33 mg/ml-gel.

EXAMPLE 22

(1) Immobilization of Compound Containing Alcoholic OH Group on the Outer Surfaces of Porous Particles:

In an agitating blade-equipped 500-ml separable flask were weighed 64.6 g of the particles having a moisture content of 45.8% as obtained in Production Example 5, 72.6 g of pure water, and 37.8 g of Polyethylene Glycol 1000 (molecular weight: 1000, made by Wako Pure Chemical Industries, Ltd.). Thereafter, exactly the same procedures as in Example 12 were followed. As a result, the adsorbent was found to have a solution content of dioxane of 56.7%, a residual epoxy content of 4.89 mmoles per gram of the dried gel and a degree of partial hydrophilization of 7.7%.

(2) Amination of the Inner Surfaces of Pores:

Subsequently, an amination reaction with trimethylamine was carried out. The same procedures as in Example 12 were followed, except for using 36.9 g of the dioxane-containing porous adsorbent as described above. The thus obtained adsorbent was found to have an ion exchange capacity of 0.35 meq/ml-gel.

(3) Measurement of Adsorption Capacity for Blue Dextran:

The same procedures as in Example 12 were followed to obtain an adsorption capacity for Blue Dextran of the above-described adsorbent having the compound containing alcoholic OH group immobilized on the outer surface thereof. As a result, the adsorption capacity was 0.11 mg/ml-gel.

(4) Measurement of Adsorption Capacity for Heparin:

Using the adsorbent whose inner surface was aminated, an adsorption capacity for heparin was obtained in the same manner as in Example 12. As a result, the adsorption capacity for heparin was 38 mg/ml-gel.

COMPARATIVE EXAMPLE 1

(1) Entire Amination:

Using 51.5 g of the porous particles of Production Example 1 (dioxane content: 61.2%), an amination reaction was carried out in the same manner as in Example 1. The thus obtained adsorbent was found to have an ion exchange capacity of 0.43 meq/ml-gel.

(2) Measurement of Adsorption Capacity for Blue Dextran:

The same procedures as in Example 1 were followed to obtain an adsorption capacity for Blue Dextran of the above-described entirely aminated adsorbent. As a result, the adsorption capacity was 1.23 mg/ml-gel.

(3) Measurement of Adsorption Capacity for Heparin:

Using the above-described entirely aminated adsorbent, an adsorption capacity for heparin was obtained in the same manner as in Example 1. As a result, the adsorption capacity for heparin was 49 mg/ml-gel.

COMPARATIVE EXAMPLE 2

(1) Entire Hydrophilization of Production Example 2:

In a 300-ml separable flask were weighed 50.5 g of the porous particles having a dioxane content of 60.4% as produced in Production Example 2, 37 g of Polyethylene Glycol 2000 (molecular weight: 2,000, made by Wako Pure Chemical Industries, Ltd.), 62 g of dioxane, and 50.5 g of pure water, and the mixture was heated while agitating. At the stage when the inner temperature reached 70° C., 1.1 g of NaOH was added, and the mixture was allowed to react for 15 hours while keeping the temperature at 70° C. Thereafter, the reaction mixture was transferred on a filter and washed with warm water until the filtrates had become at a pH of 7. A moisture content of the adsorbent as obtained was measured in the same manner as in Example 1. As a result, the moisture content was 58.6%. The adsorbent was dried and measured for degree of hydrophilization by an elemental analysis method. As a result, the degree of hydrophilization was 94.2%.

(2) Measurement of Adsorption Capacity for Blue Dextran:

The same procedures as in Example 1 were followed to obtain an adsorption capacity for Blue Dextran of the above-described entirely hydrophilized adsorbent. As a result, the adsorption capacity was 0.14 mg/ml-gel.

(3) Measurement of Adsorption Capacity for Heparin:

Using the above-described entirely hydrophilized adsorbent, an adsorption capacity for heparin was obtained in the same manner as in Example 1. As a result, the heparin was not adsorbed at all.

COMPARATIVE EXAMPLE 3

Measurement of Adsorption Capacity for Blue Dextran:

Using the porous particles as produced in Production Example 2, an adsorption capacity for Blue Dextran was obtained in the same manner as in Example 1. As a result, the adsorption capacity was 1.20 mg/ml-gel.

COMPARATIVE EXAMPLE 4

Measurement of Adsorption Capacity for Blue Dextran:

Using the porous particles per se as obtained in Production Example 3, the same procedures as in Example 6-(3) were followed. As a result, the porous particles were found to have an adsorption capacity for Blue Dextran of 1.19 mg/ml-gel.

COMPARATIVE EXAMPLE 5

(1) Entire Hydrophilization:

In a 500-ml separable flask were weighed 76.7 g of the porous particles as obtained in Production Example 4 (solution content: 70.2%), 95.5 g of pure water, 45.7 g of dioxane, and 37.8 g of Polyethylene Glycol 600 (molecular weight: about 600, made by Wako Pure Chemical Industries, Ltd.), and the mixture was heated at 70° C. while agitating. Thereafter, 14.3 g of 48% NaOH was added, and the mixture was allowed to react for 15 hours. The reaction mixture was washed well with warm water to produce entirely hydrophilized porous particles. A degree of hydrophilization of the particles was obtained in the same manner as in Example 6. As a result, the degree of hydrophilization was 95.8%.

(2) Measurement of Adsorption Capacity for Blue Dextran:

Using the entirely hydrophilized porous particles as obtained above in (1), the same procedures as in Example 6-(5) were followed to try to carry out the measurement of adsorption capacity for Blue Dextran. However, the Blue Dextran was not adsorbed.

(3) Measurement of Adsorption Capacity for Heparin:

Using the entirely hydrophilized porous particles as obtained above in (1), the same procedures as in Example 6-(6) were followed to measure an adsorption capacity for heparin. However, the heparin was not adsorbed.

COMPARATIVE EXAMPLE 6

(1) Entire Amination:

Using 47.8 g of the porous particles as obtained in Production Example 1, the same procedures as in Example 10-(3) were followed to produce entirely aminated porous particles. The particles were found to have an ion exchange capacity of 0.42 meq/ml-gel.

(2) Measurement of Adsorption Capacity for Blue Dextran:

Using the entirely aminated porous particles as obtained above in (1), the same procedures as in Example 6-(3) were followed. As a result, the porous particles were found to have an adsorption capacity for Blue Dextran of 1.17 mg/ml-gel.

(3) Measurement of Adsorption Capacity for Heparin:

Using the entirely aminated porous particles as obtained above in (1), the same procedures as in Example 6-(6) were followed to measure an adsorption capacity for heparin. As a result, the adsorption capacity for heparin was 44 mg/ml-gel.

COMPARATIVE EXAMPLE 7

(1) Entire Amination of the Particles as Obtained in Production Example 4:

An amination reaction was carried out in the same manner as in Example 12, except for using 53.7 g of the porous particles having a dioxane content of 70.2% as obtained in Production Example 4. The thus obtained adsorbent was found to have an ion exchange capacity of 0.42 meq/ml-gel.

(2) Measurement of Adsorption Capacity for Blue Dextran:

The same procedures as in Example 12 were followed to obtain an adsorption capacity for Blue Dextran of the above-described entirely aminated adsorbent. As a result, the adsorption capacity was 1.24 mg/ml-gel.

(3) Measurement of Adsorption Capacity for Heparin:

Using the above-described entirely aminated adsorbent, an adsorption capacity for heparin was obtained in the same manner as in Example 12. As a result, the adsorption capacity for heparin was 49 mg/ml-gel.

COMPARATIVE EXAMPLE 8

(1) Entire Hydrophilization of the Particles as Obtained in Production Example 3:

In a 300-ml separable flask were weighed 51.5 g of the porous particles having a dioxane content of 61.2% as produced in Production Example 3, 37 g of Polyethylene Glycol 600 (molecular weight: 600, made by Wako Pure Chemical Industries, Ltd.), 62 g of dioxane, and 51.5 g of pure water, and the mixture was heated while agitating such that the inner temperature became 70° C. When the inner temperature reached 70° C., 1.1 g of NaOH was added, and the mixture was allowed to react at a temperature of 70° C. for 15 hours. Thereafter, the reaction mixture was transferred on a filter and washed well with warm water until the filtrates had become at a pH of 7. A moisture content and a degree of hydrophilization of the adsorbent were obtained in the same manner as in Example 12. As a result, the moisture content and the degree of hydrophilization were 52.6% and 94.8%, respectively.

(2) Measurement of Adsorption Capacity for Blue Dextran:

The same procedures as in Example 12 were followed to obtain an adsorption capacity for Blue Dextran of the above-described entirely hydrophilized adsorbent. As a result, the adsorption capacity was 0.07 mg/ml-gel.

(3) Measurement of Adsorption Capacity for Heparin:

Using the above-described entirely hydrophilized adsorbent, an adsorption capacity for heparin was obtained in the same manner as in Example 12. As a result, the heparin was not adsorbed.

COMPARATIVE EXAMPLE 9

Measurement of Adsorption Capacity for Blue Dextran:

The same procedures as in Example 12 were followed to obtain an adsorption capacity for Blue Dextran of the particles as obtained in Production Example 3. As a result, the adsorption capacity was 1.18 mg/ml-gel.

As described above, according to the production process of the invention, a partially hydrophilized porous adsorbent having a compound containing alcoholic OH group immobilized only on the outer surface thereof can be easily obtained. Also, in the thus produced partially hydrophilized porous adsorbent, it is possible to easily immobilize various ligands on the inner surface thereof. Accordingly, a dual surface adsorbent can easily be produced according to the invention. In the dual surface adsorbent as produced by the invention, the outer surface thereof is covered by the compound containing alcoholic OH group, and the inner surface thereof is immobilized with a ligand to adsorb pathogenic substances. Thus, in the case where the dual surface adsorbent is applied to, for example, a direct hemoperfusion method, it gives rise to superior effects such that it is superior in biocompatibility, it does not cause coagulation of blood, and it can efficiently adsorb the target pathogenic substances.

While the invention has been described in detail and with reference to specific embodiments thereof, it will be apparent to one skilled in the art that various changes and modifications can be made therein without departing from the spirit and scope thereof.

What is claimed is:

1. A process for production of a partially hydrophilized porous adsorbent, which comprises using, as a starting material, porous particles comprising an organic compound having properties such that they are shrunk in a solvent comprising water as a major component and swollen in a solvent comprising an organic solvent as a major component; newly introducing functional groups to react with any one compound selected from the group consisting of compounds containing hydroxyl, amino, carboxyl, halogen or epoxy group in a solvent comprising an organic solvent as a major component; and then reacting with a compound containing alcoholic OH group in a solvent comprising water as a major component to immobilize the compound containing alcoholic OH group on the outer surfaces of the particles.

2. The process for production of a partially hydrophilized porous adsorbent according to claim 1, wherein subsequent to the steps, the porous particles are allowed to react with a ligand in a mixed solvent of an organic material and water, thereby immobilizing the ligand on the inner surfaces of the particles.

3. The process for production of a partially hydrophilized porous adsorbent according to claim 1, wherein at least one of the reaction with the compound containing alcoholic OH group and the reaction with the ligand is carried out in the presence of a catalyst.

4. A process for production of a partially hydrophilized porous adsorbents, which comprises reacting porous particles impregnated in water-insoluble organic solvent with compounds containing alcoholic OH group in a solvent comprising water as a major component to immobilize the compound containing alcoholic OH group on the outer surface of the porous particles.

5. The process for production of a partially hydrophilized porous adsorbent according to claim 4, wherein subsequent to the steps, the porous particles are allowed to react with a ligand in a mixed solvent of an organic material and water, thereby immobilizing the ligand on the inner surfaces of the particles.

6. The process for production of a partially hydrophilized porous adsorbent according to claim 4, wherein at least one of the reaction with the compound containing alcoholic OH group and the reaction with the ligand is carried out in the presence of a catalyst.

7. A process for production of a partially hydrophilized porous adsorbent, which comprises using, as a starting material, porous particles comprising an organic compound having functional groups to react with any one compound selected from the group consisting of compounds containing hydroxyl, amino, carboxyl, halogen or epoxy group and having properties such that they are shrunk in a solvent comprising water as a major component and swollen in a solvent comprising an organic solvent as a major component; and reacting with a compound containing alcoholic OH group in a solvent comprising water as a major component to immobilize the compound containing alcoholic OH group on the outer surfaces of the particles.

8. The process for production of a partially hydrophilized porous adsorbent according to claim 7, wherein subsequent to the steps, the porous particles are allowed to react with a ligand in a mixed solvent of an organic material and water, thereby immobilizing the ligand on the inner surfaces of the particles.

9. The process for production of a partially hydrophilized porous adsorbent according to claim 7, wherein at least one of the reaction with the compound containing alcoholic OH group and the reaction with the ligand is carried out in the presence of a catalyst.

* * * * *